(12) United States Patent
Yamamoto et al.

(10) Patent No.: US 7,713,317 B2
(45) Date of Patent: May 11, 2010

(54) REFORMER FOR POWER SUPPLY OF A PORTABLE ELECTRONIC DEVICE

(75) Inventors: Tadao Yamamoto, Tokyo (JP);
Naotomo Miyamoto, Tokyo (JP);
Masaharu Shioya, Akiruno (JP)

(73) Assignee: Casio Computer Co., Ltd., Tokyo (JP)

( * ) Notice: Subject to any disclaimer, the term of this patent is extended or adjusted under 35 U.S.C. 154(b) by 175 days.

(21) Appl. No.: 11/981,472

(22) Filed: Oct. 31, 2007

(65) Prior Publication Data
US 2008/0090117 A1      Apr. 17, 2008

Related U.S. Application Data

(63) Continuation of application No. PCT/JP2006/318208, filed on Sep. 7, 2006.

(30) Foreign Application Priority Data

Sep. 8, 2005   (JP)   ............... 2005-260480
Sep. 8, 2005   (JP)   ............... 2005-260497

(51) Int. Cl.
*H01M 8/04*    (2006.01)
*B01J 19/00*   (2006.01)
*H01M 8/18*    (2006.01)

(52) U.S. Cl. .................. 48/118.5; 429/19; 422/189

(58) Field of Classification Search .................. 429/19
See application file for complete search history.

(56) References Cited

U.S. PATENT DOCUMENTS 7,399,328 B2    7/2008   Ukai et al.

(Continued)

FOREIGN PATENT DOCUMENTS

CA   2 521 702 A1   8/2005

(Continued)

OTHER PUBLICATIONS

P.F. Man et al; Microfluidic Plastic Interconnects for Multi-Bioanalysis Chip Modules; SPIE vol. 3224, pp. 196-200; Sep. 29, 1997.

(Continued)

*Primary Examiner*—Jennifer K Michener
*Assistant Examiner*—Imran Akram
(74) *Attorney, Agent, or Firm*—Frishauf, Holtz, Goodman & Chick, P.C.

(57) ABSTRACT

A reactor including a high-temperature reaction unit which causes a reaction of a first reaction material to create a second reaction material and a product, and a low-temperature reaction unit which causes a reaction of the second reaction material at a temperature lower than in the high-temperature reaction unit. A coupling pipe is interposed between the high-temperature reaction unit and the low-temperature reaction unit and transfers the first reaction material and the product created with the reaction material between the high-temperature reaction unit and the low-temperature reaction unit. An external flow pipe is joined to the low-temperature reaction unit at its having one end. The external flow pipe has a plurality of flow pathways including a flow pathway for supplying the first reaction material to the high-temperature reaction unit through the low-temperature reaction unit and a flow pathway for discharging the product from the high-temperature reaction unit through the low-temperature reaction unit.

23 Claims, 24 Drawing Sheets

U.S. PATENT DOCUMENTS

| | | |
|---|---|---|
| 2002/0106540 A1 | 8/2002 | Shioya |
| 2003/0064010 A1 | 4/2003 | Allen |
| 2004/0025784 A1 | 2/2004 | Kawamura et al. |
| 2004/0148859 A1 | 8/2004 | Kawamura et al. |
| 2004/0244290 A1 | 12/2004 | Yamamoto et al. |
| 2005/0115150 A1 | 6/2005 | Ukai et al. |
| 2005/0138863 A1* | 6/2005 | Ukai et al. .................... 48/128 |
| 2006/0068247 A1 | 3/2006 | Kuwata et al. |
| 2006/0207179 A1* | 9/2006 | Mizusawa et al. ......... 48/197 R |
| 2007/0144634 A1* | 6/2007 | Miyazaki et al. ............ 148/610 |

FOREIGN PATENT DOCUMENTS

| | | |
|---|---|---|
| CN | 1413166 A | 4/2003 |
| EP | 1 256 545 A1 | 11/2002 |
| EP | 1 314 690 A1 | 5/2003 |
| JP | 02-089886 | 3/1990 |
| JP | 2002-356310 A | 12/2002 |
| JP | 2003-300703 A | 10/2003 |
| JP | 2003-327405 A | 11/2003 |
| JP | 2004-303695 A | 10/2004 |
| JP | 2005-158713 A | 6/2005 |
| JP | 2006-103978 A | 4/2006 |
| WO | WO 96/19424 A1 | 6/1996 |
| WO | WO 97/25752 A1 | 7/1997 |
| WO | WO 01/89681 A2 | 11/2001 |
| WO | WO 02/02224 A2 | 1/2002 |
| WO | WO 02/066370 A2 | 8/2002 |
| WO | WO 03/073527 A2 | 9/2003 |
| WO | WO 2004/031928 A1 | 4/2004 |
| WO | WO 2004/043587 A1 | 5/2004 |
| WO | WO 2005064030 A1 * | 7/2005 |
| WO | WO 2005077822 A1 * | 8/2005 |
| WO | WO 2007/015562 A1 | 2/2007 |

OTHER PUBLICATIONS

Japanese Office Action (and English translation thereof) dated Sep. 16, 2008, issued in counterpart Japanese Application No. 2005-260497.

Japanese Office Action (and English translation thereof) dated Sep. 16, 2008, issued in counterpart Japanese Application No. 2005-260480.

International Preliminary Report on Patentability, Chapter I of the Patent Cooperation Treaty, and Written Opinion for PCT/JP2006/318208, dated Mar. 20, 2008. 11 sheets.

Chinese Office Action dated Jul. 24, 2009 and English translation thereof issued in a counterpart Chinese Application No. 2006800170148.

* cited by examiner

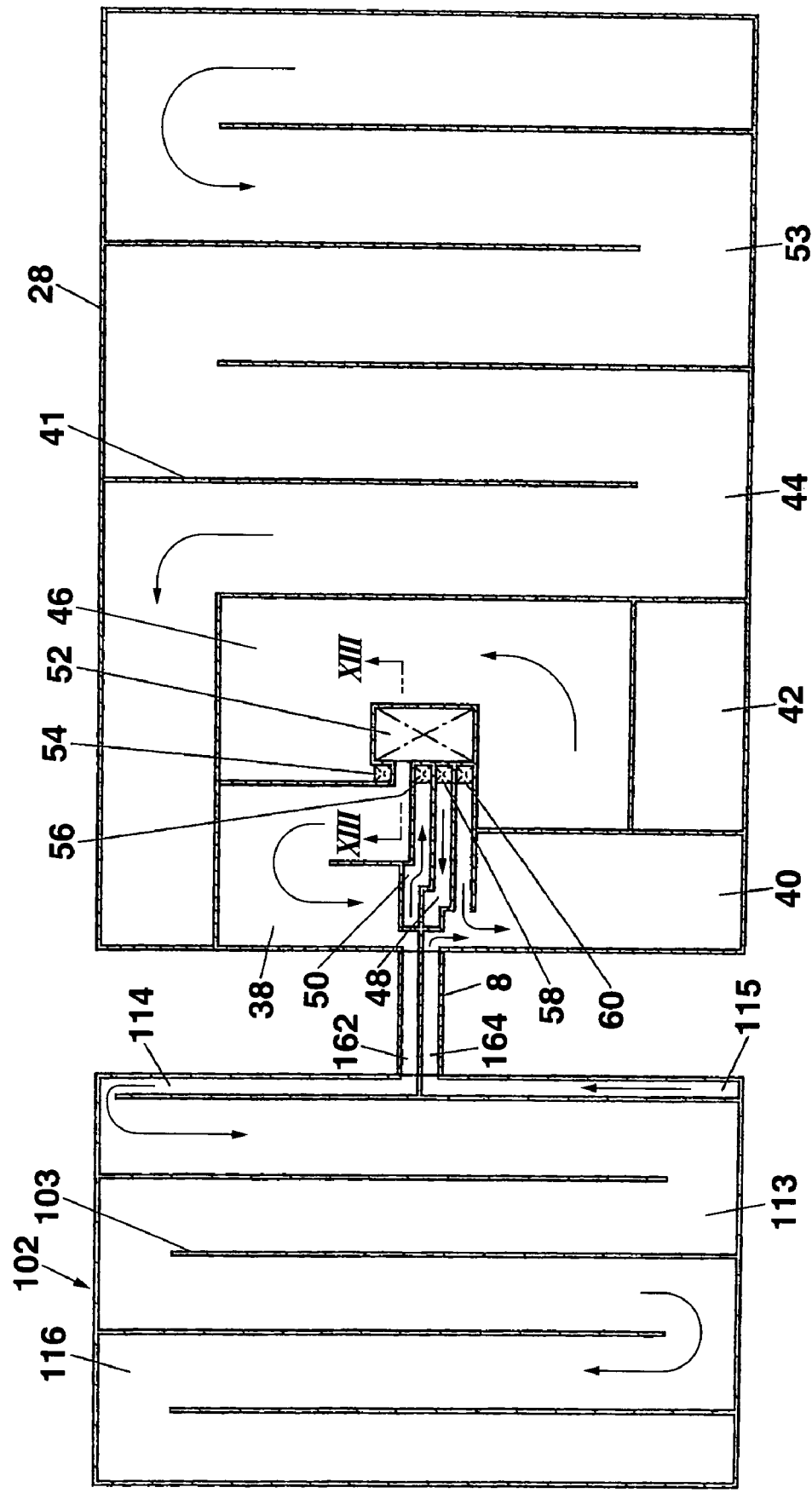

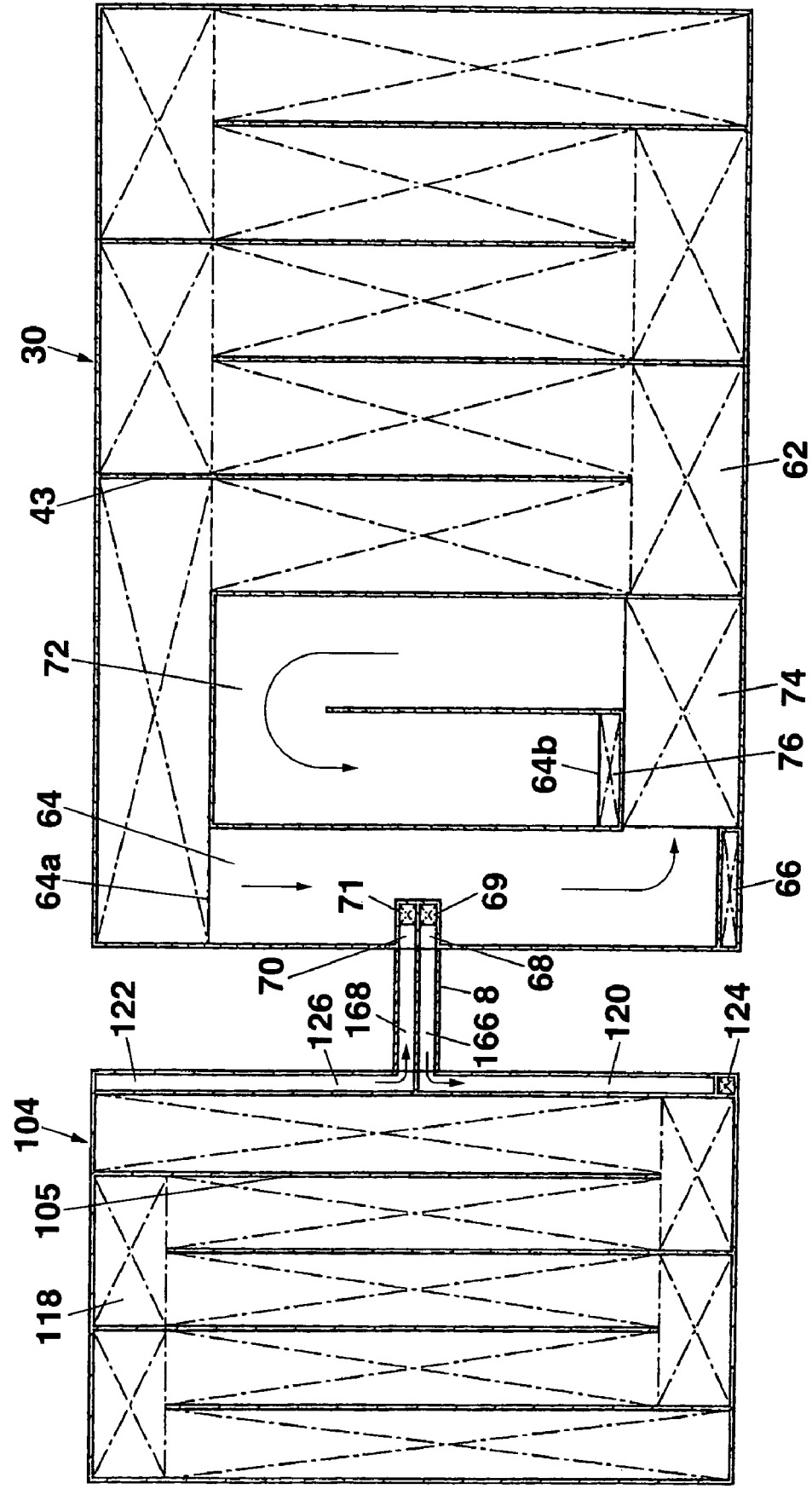

REFORMER FOR POWER SUPPLY OF A PORTABLE ELECTRONIC DEVICE

CROSS REFERENCE TO RELATED APPLICATIONS

This is a Continuation Application of PCT Application No. PCT/JP2006/318208, filed Sep. 7, 2006, which was published under PCT Article 21(2) in English.

This application is based upon and claims the benefit of priority from prior Japanese Patent Applications No. 2005-260480, filed Sep. 8, 2005; and No. 2005-260497, filed Sep. 8, 2005, the entire contents of both of which are incorporated herein by reference.

BACKGROUND OF THE INVENTION

1. Field of the Invention

The present invention relates to a reactor for reforming a liquid fuel, and more particularly to a reactor for generating hydrogen to be supplied to a fuel cell and an electronic device equipped with such a reactor.

2. Description of the Related Art

In recent years, fuel cells are being used as clean power sources having high energy conversion efficiency in, for example, motor vehicles and mobile devices. A fuel cell of this type is a device that causes an electrochemical reaction between a fuel and oxygen in the atmosphere, thereby to directly obtain electric energy from chemical energy.

While a hydrogen monomer can be used as a fuel for use in the fuel cell, a problem arises in handling the hydrogen monomer because the hydrogen monomer is a gas at the ambient temperature and pressure. Approaches also are known in which hydrogen is stored by using a hydrogen storage alloy. The approaches, however, have a problem in that the storage amount of hydrogen per unit volume is small, so that the approaches are insufficient as power-source fuel storage means of, particularly, small electronic apparatuses such as cellular electronic devices. In comparison, in reforming fuel cells of the type that generates power by using hydrogen obtainable by reforming a liquid fuel containing hydrogen atoms, such as alcohols, the fuel can easily be stored in the form of liquid, and the amount of hydrogen per unit volume of the fuel is relatively large. For using fuel cells of this type, cases take place that require a vaporizer for vaporizing the liquid fuel, a reformer for extracting hydrogen necessary for power generation by causing the reaction between the liquid fuel and high temperature water vapor, a carbon monoxide removing unit for removing carbon monoxide that is a by-product of the reforming reaction, and the like (see Jpn. Pat. Appln. KOKAI Publication No. 2002-356310, for example).

In the disclosed technique, an optimal operation temperature range of the vaporizer and/or the carbon monoxide removing unit is different from an optimal operation temperature range of the reformer, therefore making it difficult to produce temperature differences across the different temperature ranges.

Further, several pipes have to be coupled to the vaporizer, the reformer, and the carbon monoxide removing unit to perform processes, such as supply of the fuel and/or oxygen, and discharging of hydrogen. In this case, heat of the vaporizer, the reformer, and the carbon monoxide removing unit transfers as it is to the outside through the pipes, thereby causing significant heat losses.

Further, the carbon monoxide removing unit and the reformer are interconnected through the pipes or flow pathways through which the reformed fuel and the like flow. In particular, in a case where the carbon monoxide removing unit and the reformer are interconnected through the respective coupling pipes corresponding to a plurality of flow pathways, the reformer and the carbon monoxide removing unit are different from each other in the amount of expansion depending on the temperature difference. Consequently, excessive stresses may impose on connection portions, consequently leading to damage in the connection portions.

BRIEF SUMMARY OF THE INVENTION

An object of the present invention is to provide a reactor and an electronic apparatus using the reactor, the reactor being capable of producing temperature differences between a section causing reaction at a high temperature and a section causing the reaction at a low temperature and being further capable of reducing heat losses.

Another object of the present invention is to provide a reactor and an electronic apparatus using the reactor, the reactor being capable of producing temperature differences between a section causing reaction at a high temperature and a section causing the reaction at a low temperature and being further capable of preventing an excessive amount of stress from acting on connecting portions between the sections causing the reactions.

In order to achieve the above object, according to a first aspect of the present invention, there is provided a reactor comprising:

a high-temperature reaction unit which causes a reaction of a reaction material;

a low-temperature reaction unit which causes the reaction of the reaction material at a temperature lower than in the high-temperature reaction unit;

a coupling pipe which is interposed between the high-temperature reaction unit and the low-temperature reaction unit and which transfers the reaction material and a product created with the reaction material between the high-temperature reaction unit and the low-temperature reaction unit; and an external flow pipe having one end joined to the low-temperature reaction unit and having a plurality of flow pathways including a flow pathway for supplying the reaction material to the high-temperature reaction unit through the low-temperature reaction unit and a flow pathway for discharging the product from the high-temperature reaction unit through the low-temperature reaction unit.

According to the reactor, since any one of the flow pathways is coupled to the low-temperature reaction unit, direct heat transfer to the outside from the high-temperature reaction unit can be restrained, and hence heat losses in the high-temperature reaction unit can be restrained. Consequently, even in the case where both the high-temperature reaction unit and the low-temperature reaction unit are stored in a heat insulating package, temperature differences can be produced between the high-temperature reaction unit and the low-temperature reaction unit.

The external flow pipe may have one pipe member in a state where said plurality of flow pathways are portioned by partition walls. In this case, since heat transfer can easily be accomplished through the pipe member, efficient heat exchange can be performed between flow pathways for supply operations and flow pathways for performing discharging through the external flow pipe from the low-temperature reaction unit.

The external flow pipe may have a plurality of pipe members provided respectively with said plurality of flow pathways.

The high-temperature reaction unit may comprise a reformer which reforms a fuel. In the case where the reformer is of a reformer acquiring hydrogen by reforming fuel, the fuel is preheated by the low-temperature reaction unit before reaching the reformer. Consequently, the temperature of the reformer can be prevented from being extremely reduced when heating the fuel, and hence the heat can be appropriately distributed. This is especially effective in an event where the reforming reaction is an endothermic reaction such as a water vapor reforming reaction, because the amount of heat required by the reformer for the reformation is large.

The low-temperature reaction unit may comprise a carbon monoxide removing unit which removes carbon monoxide contained in a product. The carbon monoxide removing unit can preheat the reaction material before the reaction material for reaction in the high-temperature reaction unit reaches the high-temperature reaction unit. In this case, even when the heat of the carbon monoxide removing unit is partly withdrawn to the high-temperature reaction unit, the carbon monoxide removing unit is heated by heat of the product supplied from the high-temperature reaction unit, therefore preventing the temperature of the carbon monoxide removing unit from significantly decreasing.

The high-temperature reaction unit may comprise a combustor which combusts a fuel. In particular, a combustible substance unconsumed in the fuel cell, such as hydrogen, can be used as the fuel for the combustor.

The external flow pipe may comprise a flow pathway which supplies the fuel to the combustor. Consequently, the flow pathway drawing the fuel into the combustor can be heated by exhaust heat of the flow pathway for discharging the product in the external flow pipe.

The external flow pipe may be provided with a vaporizer which causes a liquid fuel to vaporize. In this case, since the reaction material is drawn into the high-temperature reaction unit after having been vaporized by the vaporizer, the reaction material can be stably and efficiently reacted.

The vaporizer may be heated by heat in the flow pathway which discharges the product from the high-temperature reaction unit. Since the exhaust heat for the product is used in this manner, efficient vaporization can be accomplished.

Further, the vaporizer may be heated by a combustor which combusts a fuel supplied from any one of said plurality of flow pathways of the external flow pipe.

At least one of the high-temperature reaction unit and the low-temperature reaction unit may be heated by using electrical resistors, such as heating wires, at least in the event of activation. Likewise, the vaporizer also may be heated by using electrical resistors such as heating wires.

The vaporizer may be filled with a liquid absorptive material. With a flow pathway of the vaporizer being thus filled with the liquid absorptive material, the liquid fuel is absorbed by the liquid absorptive material and is caused to vaporize in the liquid absorptive material, so that the liquid fuel can be caused to stably vaporize.

There may be provided a heat insulating package which stores the high-temperature reaction unit, the low-temperature reaction unit and the coupling pipe, and also stores at least a part of the external flow pipe. The heat insulating package can provide efficient heat insulation of the high-temperature reaction unit, the low-temperature reaction unit, and the coupling pipe. Further, even if the external flow pipe is arranged in part externally of the heat insulating package, the amount of heat possibly transferring and dissipating through the external flow pipe is relatively small since the external flow pipe is provided on the side of the low-temperature reaction unit.

The reactor described above is well suited for use with an electronic apparatus combined with a fuel cell. Thereby, the fuel cell can be driven to generate electricity by using the product created by the reactor.

The electronic apparatus described above may be comprise a display panel.

In order to achieve the other objects, according to another aspect of the present invention, there is provided an electronic apparatus comprising:

the reactor according to the first aspect; and a fuel cell which generates electricity by using the product created by the reactor.

Preferably, a height of the coupling pipe is smaller than a height of the high-temperature reaction unit and a height of the low-temperature reaction unit.

Preferably, the coupling pipe is interposed in a central portion in a width direction between the respective opposite faces.

The number of the coupling pipes may be only one.

The coupling pipe may be provided with a plurality of coupling flow pathways which transfer either the reaction material or a product between the high-temperature reaction unit and the low-temperature reaction unit.

Said plurality of coupling flow pathways may be arranged along a width direction of the coupling pipe.

Said plurality of coupling flow pathways may be arranged in a grating state along a width direction of the coupling pipe on a cross section along the width direction.

Preferably, thermal expansion coefficients of the high-temperature reaction unit and the low-temperature reaction unit are substantially the same.

The reactor described above is well suited for use with an electronic apparatus combined with a fuel cell. Thereby, the fuel cell can be driven to generate electricity by using the product created by the reactor.

The electronic apparatus described above may further comprises a display panel.

According to the present invention, the plurality of flow pathways are coupled to the low-temperature reaction unit, thereby to enable the direct heat transfer to the outside from the high-temperature reaction unit. Consequently, the high-temperature reaction unit maintained to the high temperature is able to maintain temperature differences from the low-temperature reaction unit, and heat losses in the high-temperature reaction unit can be minimized.

In addition, according to the present invention, the coupling pipe is interposed between the high-temperature reaction unit and the low-temperature reaction unit. In addition, since the coupling pipe is narrower in the width from the respective opposite faces of the high-temperature reaction unit and the low-temperature reaction unit to thereby restrain the heat transfer, temperature difference can be produced between the high-temperature reaction unit and the low-temperature reaction unit. Further, in the case where the number of coupling pipes between the high-temperature reaction unit and the low-temperature reaction unit is only one, excessive bending stresses do not occur in the coupling pipe even when the high-temperature reaction unit has thermally expanded greater than the low-temperature reaction unit.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 7 is a cross sectional view taken along the section line VII-VII of FIG. 3.

FIG. 8 is a cross sectional view taken along the section line VIII-VIII of FIG. 3.

DETAILED DESCRIPTION OF THE INVENTION

A best mode for carrying out the present invention will be described below with reference to the accompanying drawings. Embodiments described below include various restrictions preferable for carrying out the invention, but it is to be understood that the scope of the invention is not restricted by the embodiments and relevant examples shown in the accompanying drawings.

Figure 1:
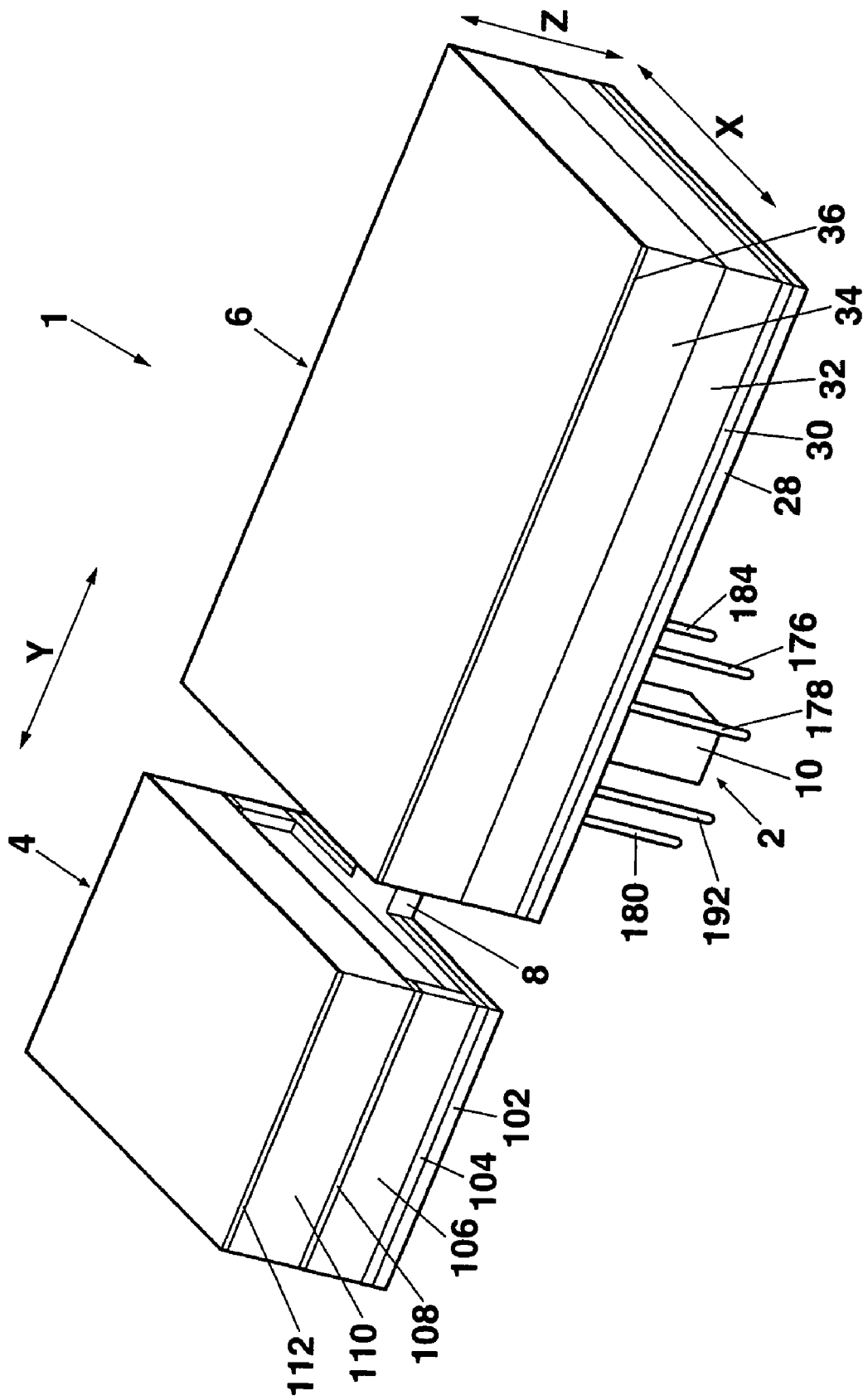
FIG. 1 is a perspective view of a microreactor module as viewed from a slant upper side.
Figure 2:
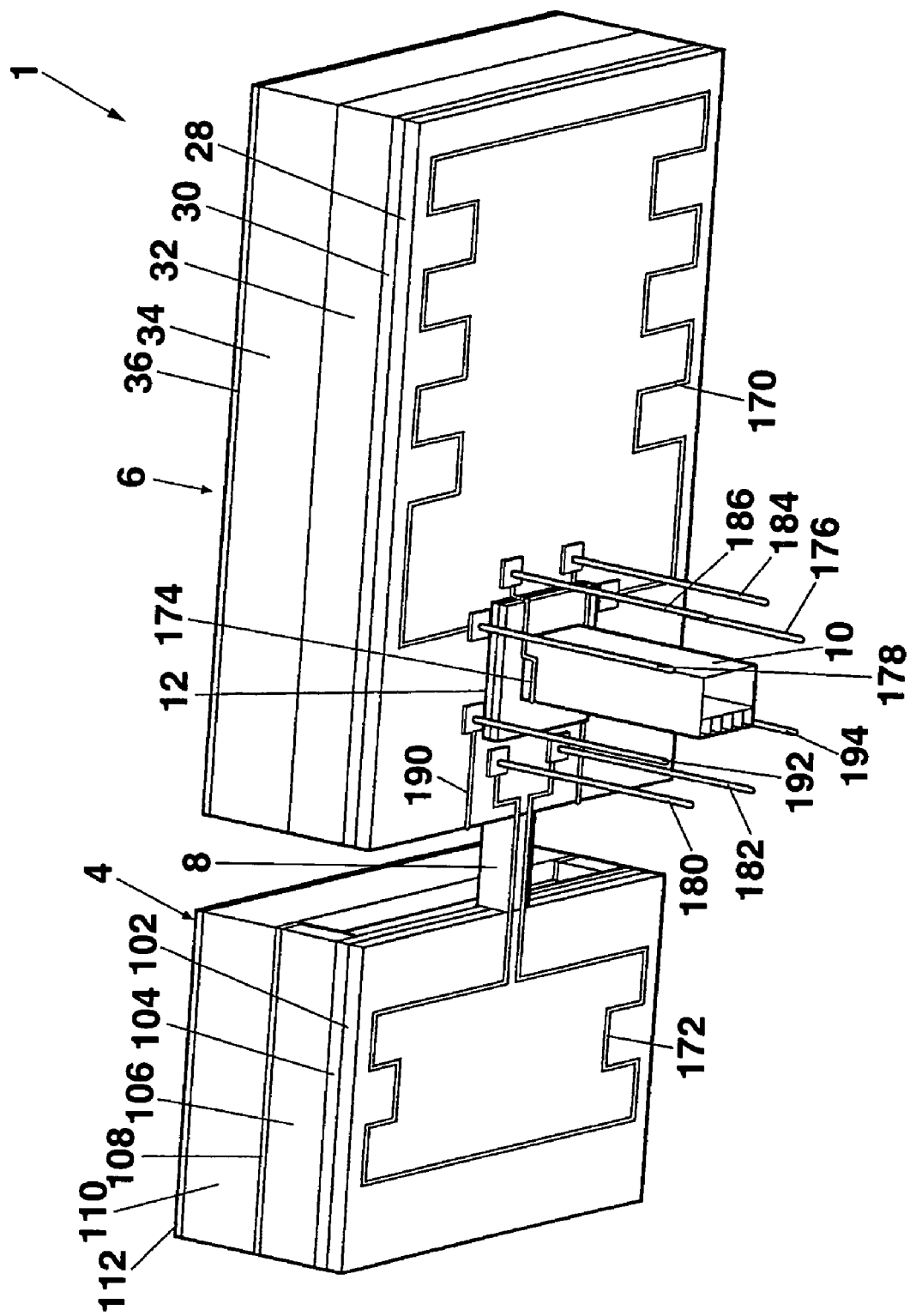
FIG. 2 is a perspective view of the microreactor module as viewed from a slant lower side.
Figure 3:
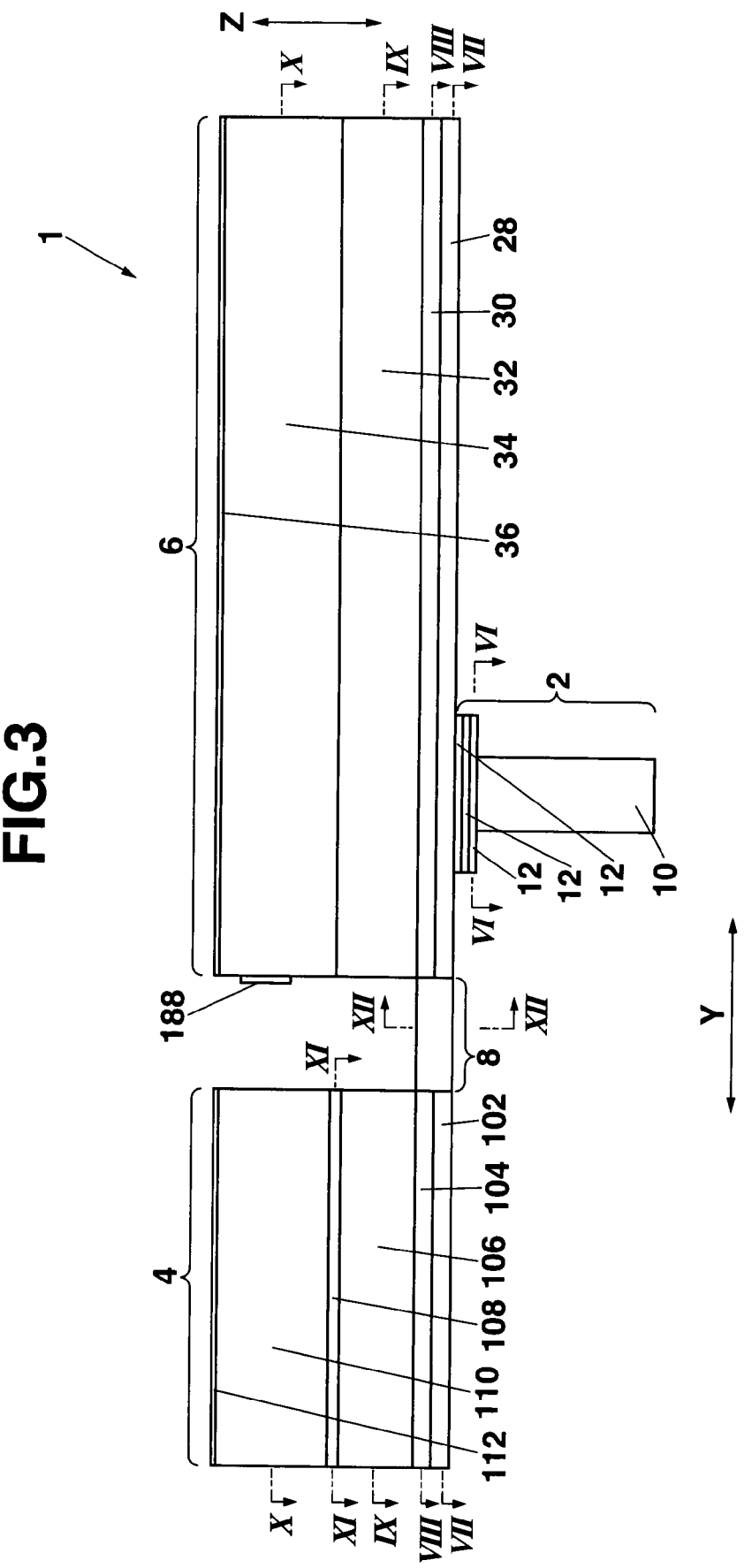
FIG. 3 is a side view of the microreactor module.

FIG. 1 is a perspective view of a microreactor module 1 as viewed from a slant upper side, FIG. 2 is a perspective view of the microreactor module 1 as viewed from a slant lower side, and FIG. 3 is a side view of the microreactor module 1.

The microreactor module 1 is a reactor for generating hydrogen gases for use in fuel cells, and preferably is used by being incorporated in any one of electronic devices or apparatuses, such as a notebook personal computer, a PDA (personal digital assistant), an electronic notebook terminal, a digital camera, cellular phone, a wrist watch, a register, and a projector. The microreactor module 1 includes a supply and discharge unit 2, a high-temperature reaction unit 4, a low-temperature reaction unit 6, and a coupling pipe 8. The supply and discharge unit 2 performs supply of reaction materials and discharging of products. The high-temperature reaction unit 4 allows reforming reactions at high temperatures relative to an optimal reaction temperature range in a low-temperature reaction unit 6 described later. The low-temperature reaction unit 6 allows selective oxidation reactions at low temperatures relative to an optimal reaction temperature range in the high-temperature reaction unit 4. The coupling pipe 8 is allows inflow or outflow of reaction materials and products between the high-temperature reaction unit 4 and the low-temperature reaction unit 6. In the description and the drawings, a width direction X refers to the short-side direction of the overall microreactor module 1, which is parallel to opposite base plate faces of the high-temperature reaction unit 4 and the low-temperature reaction unit 6. A length direction Y refers to the long-side (longitudinal) direction of the overall microreactor module 1. In addition, a height direction Z refers to the thickness direction of the overall microreactor module 1, which is perpendicular to opposite base plate faces of the high-temperature reaction unit 4 and the low-temperature reaction unit 6. The coupling pipe 8 is arranged between opposite faces, which are opposite to one another, of the high-temperature reaction unit 4 and the low-temperature reaction unit 6. The coupling pipe 8 is coupled in one portion with the high-temperature reaction unit 4 and is coupled in one portion with the low-temperature reaction unit 6. More particularly, as viewed along the width direction X, the coupling pipe 8 is coupled with a central portion of the high-temperature reaction unit 4, and is coupled with a central portion of the low-temperature reaction unit 6. As viewed along the height direction Z, the coupling pipe 8 is coupled with a lower end portion of the high-temperature reaction unit 4, and is coupled with a lower end portion of the low-temperature reaction unit 6. The width of the coupling pipe 8 along the width direction X is shorter than the width of the opposite face of either the high-temperature reaction unit 4 or low-temperature reaction unit 6 along the width direction X. The height of the coupling pipe 8 along the height direction Z is shorter than the opposite face of the opposite face of either the high-temperature reaction unit 4 or low-temperature reaction unit 6 along the height direction Z. Preferably, the coupling pipe 8 is located in the center of the high-temperature reaction unit 4 along the width direction X in order to achieve a homogeneous distribution of thermal expansion of the coupling pipe 8 on the side of the high-temperature reaction unit 4 in the width direction X. In addition, the coupling pipe 8 is preferably located in the center of the low-temperature reaction unit 6 along the width direction X in order to achieve a homogeneous distribution of thermal expansion of the coupling pipe 8 on the side of the low-temperature reaction unit 6 in the width direction X. The coupling pipe 8 is formed by routing a heating wire 172 to be described later, which is provided on the lower face of the high-temperature reaction unit 4, on the lower face of the coupling pipe 8. As such, desirably, the lower faces of the high-temperature reaction unit 4 and the coupling pipe 8 are formed to not have irregular portions or steps. Taking this into account, the coupling pipe 8 is arranged to be located in the respective lower end faces of the high-temperature reaction unit 4 and the low-temperature reaction unit 6.

Figure 4:
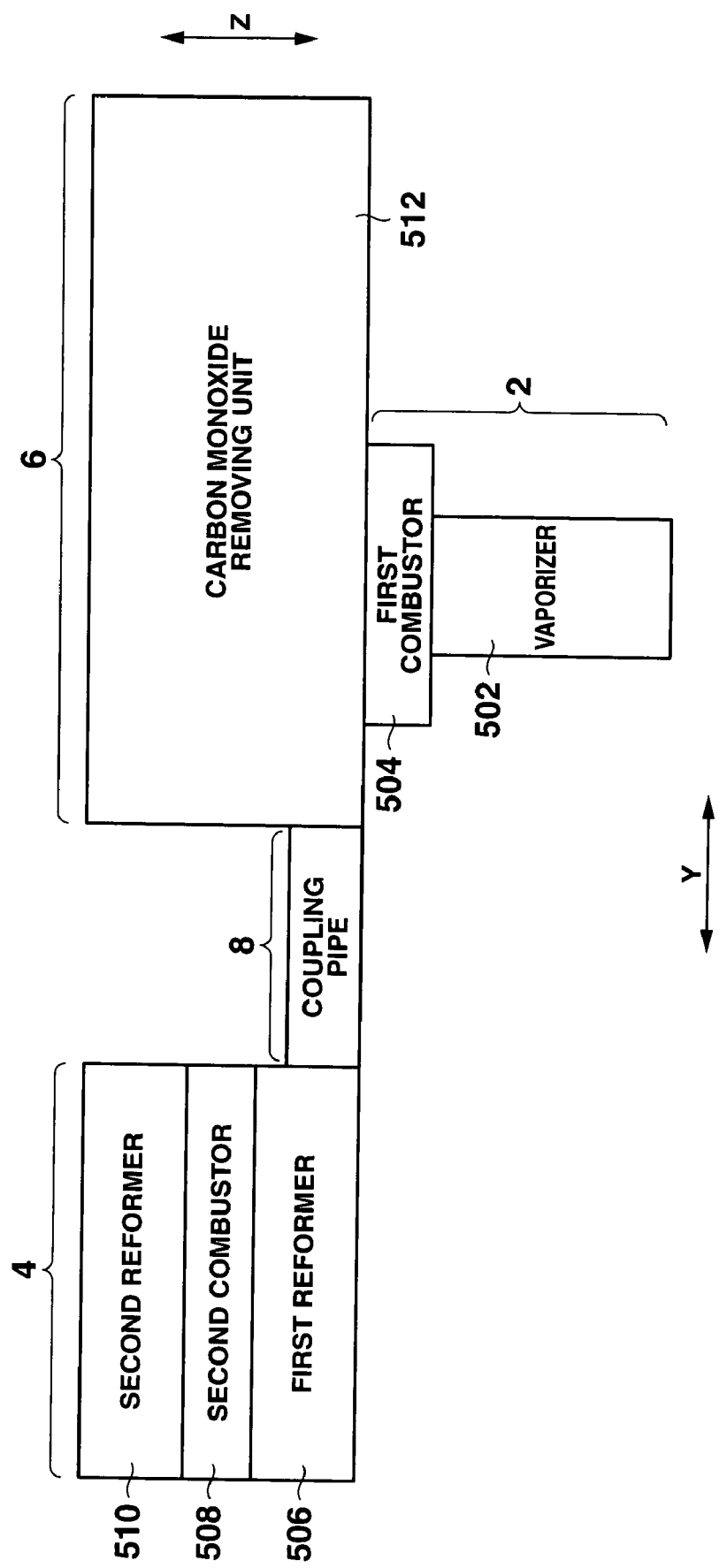
FIG. 4 is a schematic side view of the microreactor module separated in terms of a function.

FIG. 4 is a schematic side view of the microreactor module 1 separated in terms of a function. As main components, a vaporizer 502 and a first combustor 504 are provided in the supply and discharge unit 2, as shown in FIG. 4. The first combustor 504 is supplied with a fuel (hydrogen gas, methanol gas, or the like, for example) and gas separately or in the form of a gas mixture, in which the fuel is vaporized at least in part and the gas serves as an oxygen source such as air containing oxygen for combusting the fuel. These gases are combusted by a catalyst existing in the first combustor 504, thereby to generate heat. The vaporizer 502 is supplied with water and a liquid fuel (alcohol such as methanol or ethanol, ether such as dimethyl ether, or a fossil fuel such as gasoline, for example) separately or in a mixed form from a fuel container. Combustion heat in the first combustor 504 propagates into the vaporizer 502, whereby the water and the liquid fuel are vaporized in the vaporizer 502.

The high-temperature reaction unit 4 includes mainly a first reformer 506, a second combustor 508, and a second reformer 510. The first and second reformers 506, 510, respectively, are reformers that reform the fuel to thereby generate hydrogen, and have constructions to communicate with each other. The first reformer 506 is arranged on the lower side and the second reformer 510 is arranged on the upper side, in which the second combustor 508 is interposed between the first and second reformers 506, 510.

The second combustor 508 is supplied with a fuel (hydrogen gas, methanol gas, or the like, for example) and gas separately or in the form of a gas mixture, in which the fuel is vaporized at least in part and the gas serves as an oxygen source such as air containing oxygen for combusting the fuel. These gases are combusted by a catalyst existing in the second combustor 508, thereby generating heat. Depending on the case, off gases discharged from the fuel cell after the hydrogen gas has been supplied and electrochemical reaction has occurred contain unreacted hydrogen gas. As such, at least one of the first combustor 504 and the second combustor 508 can be set to combust the unreacted hydrogen gas with oxygen-contained gas, thereby to generate heat. Of course, the process may be such that at least one of the first combustor 504 and the second combustor 508 uses a different vaporizer to vaporize a liquid fuel (methanol, ethanol, butane, dimethyl ether, or gasoline, for example) stored in the fuel container, and then combusts the vaporized fuel with gas such as air containing oxygen.

In the case where the second combustor 508 combusts the off gases discharged from the fuel cell, first, the first reformer 506 and the second reformer 510 are heated by the heating wire 172 (described further below) at the time of activation to thereby generate hydrogen. When the hydrogen-containing off gases have been normally discharged from the fuel cell, which will be supplied with the hydrogen, the second combustor 508 combusts the hydrogen in the off gases to thereby heat the first reformer 506 and the second reformer 510. When the second combustor 508 is shifted to a primary heat source, the heating wire 172 lowers the applied voltage to shift the second combustor 508 to an auxiliary heat source. In the heated first and second reformers 506 and 510, hydrogen gas and the like are generated by catalyst reactions from the water and the fuel, and carbon monoxide gas also is generated while the amount thereof is small. In the case of methanol being used as the fuel, chemical reactions take place as shown in formulas (1) and (2). The reaction generating the hydrogen is an endothermic reaction in which combustion heat of the second combustor 508 is used.

$$CH_3OH + H_2O \rightarrow 3H_2 + CO_2 \qquad (1)$$

$$2CH_3OH + H_2O \rightarrow 5H_2 + CO + CO_2 \qquad (2)$$

The low-temperature reaction unit 6 includes mainly a carbon monoxide removing unit 512. The carbon monoxide removing unit 512 is heated by the first combustor 504 and then supplied with a gas mixture containing hydrogen gas, carbon monoxide, and the like from the first reformer 506 and the second reformer 510 and is further supplied with air therefrom. In the carbon monoxide removing unit 512, the carbon monoxide of the gas mixture is selectively oxidized, whereby the carbon monoxide is removed. A gas mixture (hydrogen rich gas) in the state where the carbon monoxide has been removed is supplied to a fuel electrode or pole of the fuel cell.

Figure 5:
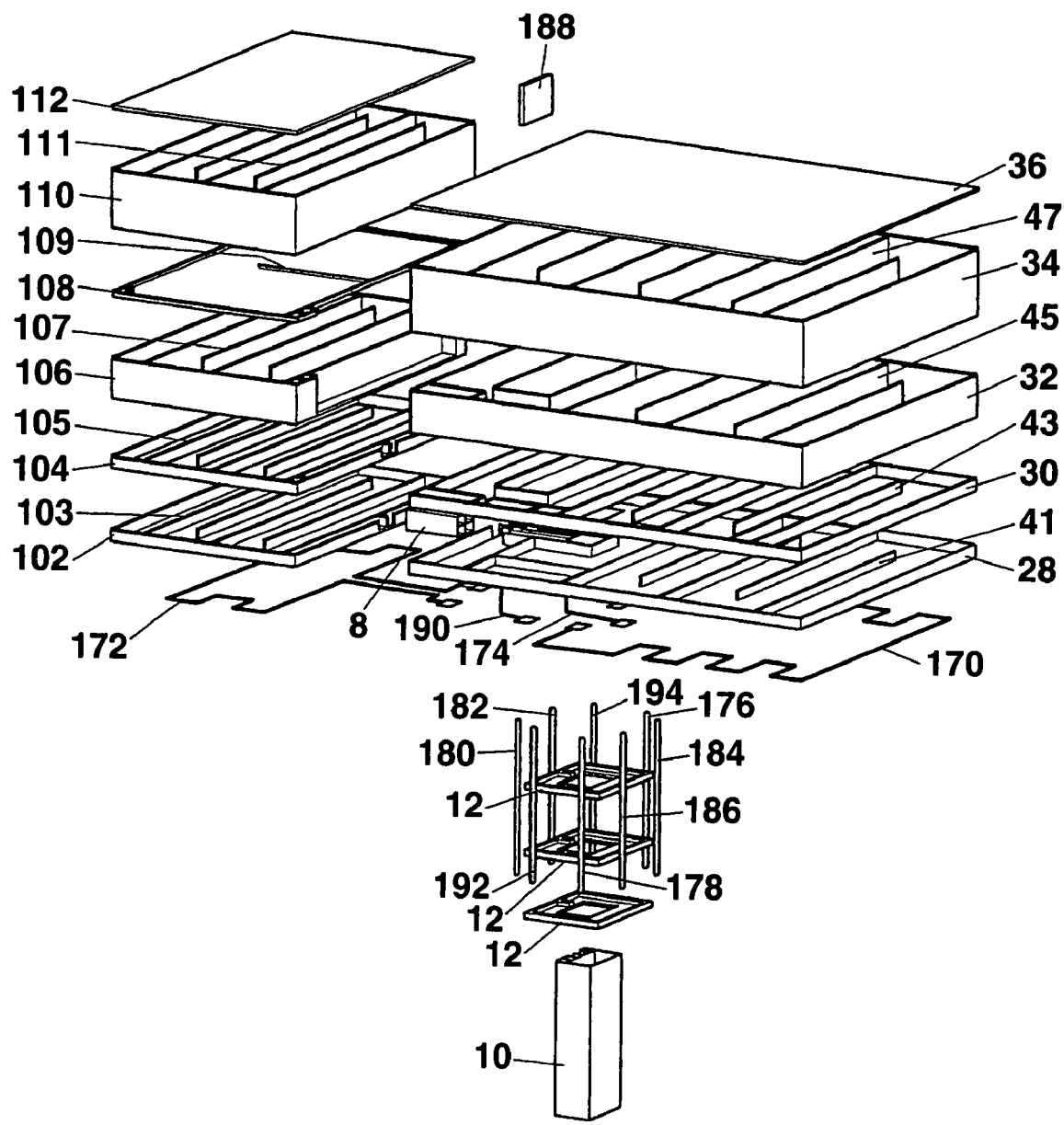
FIG. 5 is an exploded perspective view of the microreactor module.
Figure 6A:
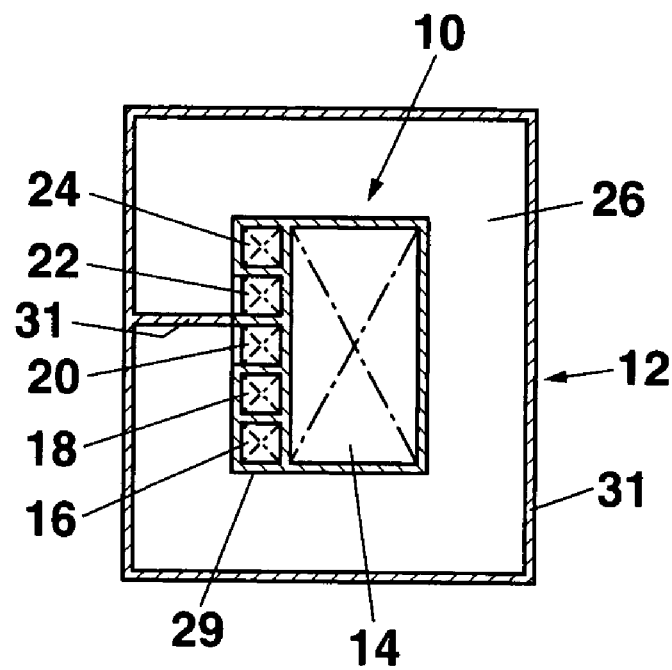
FIGS. 6A and 6B are cross sectional views taken along the section line VI-VI of FIG. 3 and showing the states with an external flow pipe and without the external flow pipe, respectively.
Figure 6B:
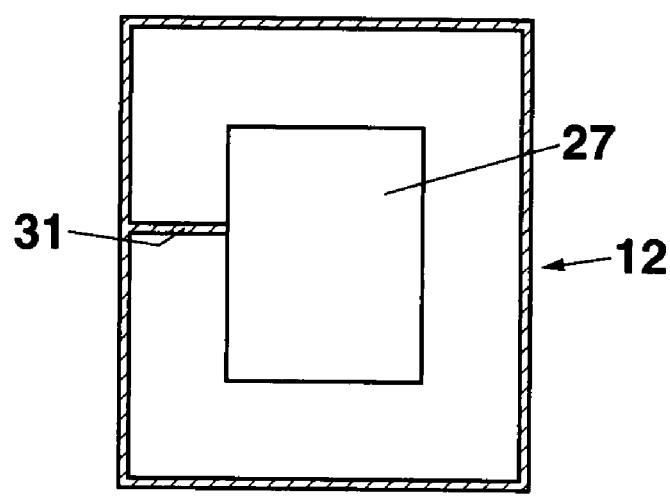
Figure 9:
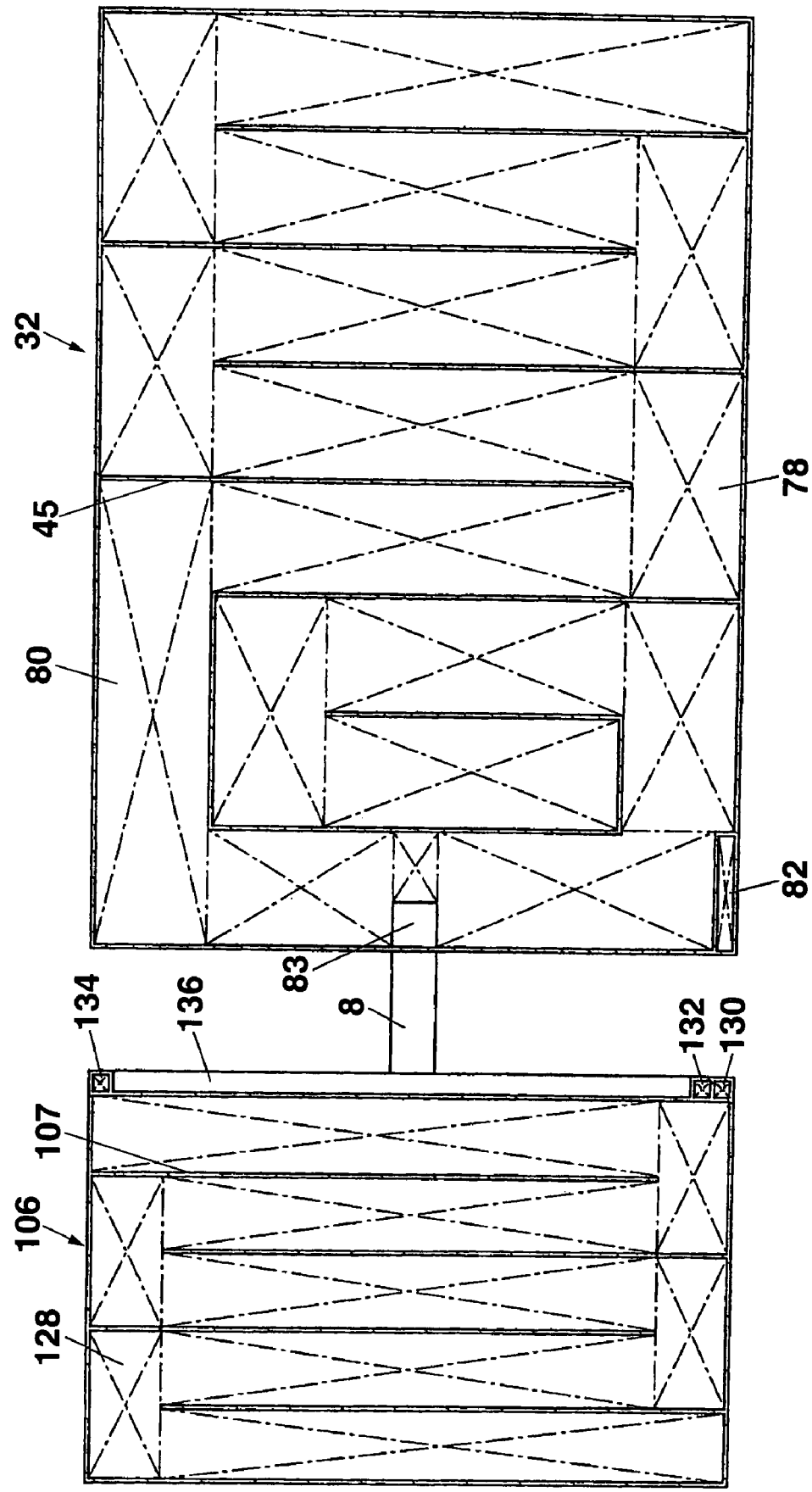
FIG. 9 is a cross sectional view taken along the section line IX-IX of FIG. 3.
Figure 10:
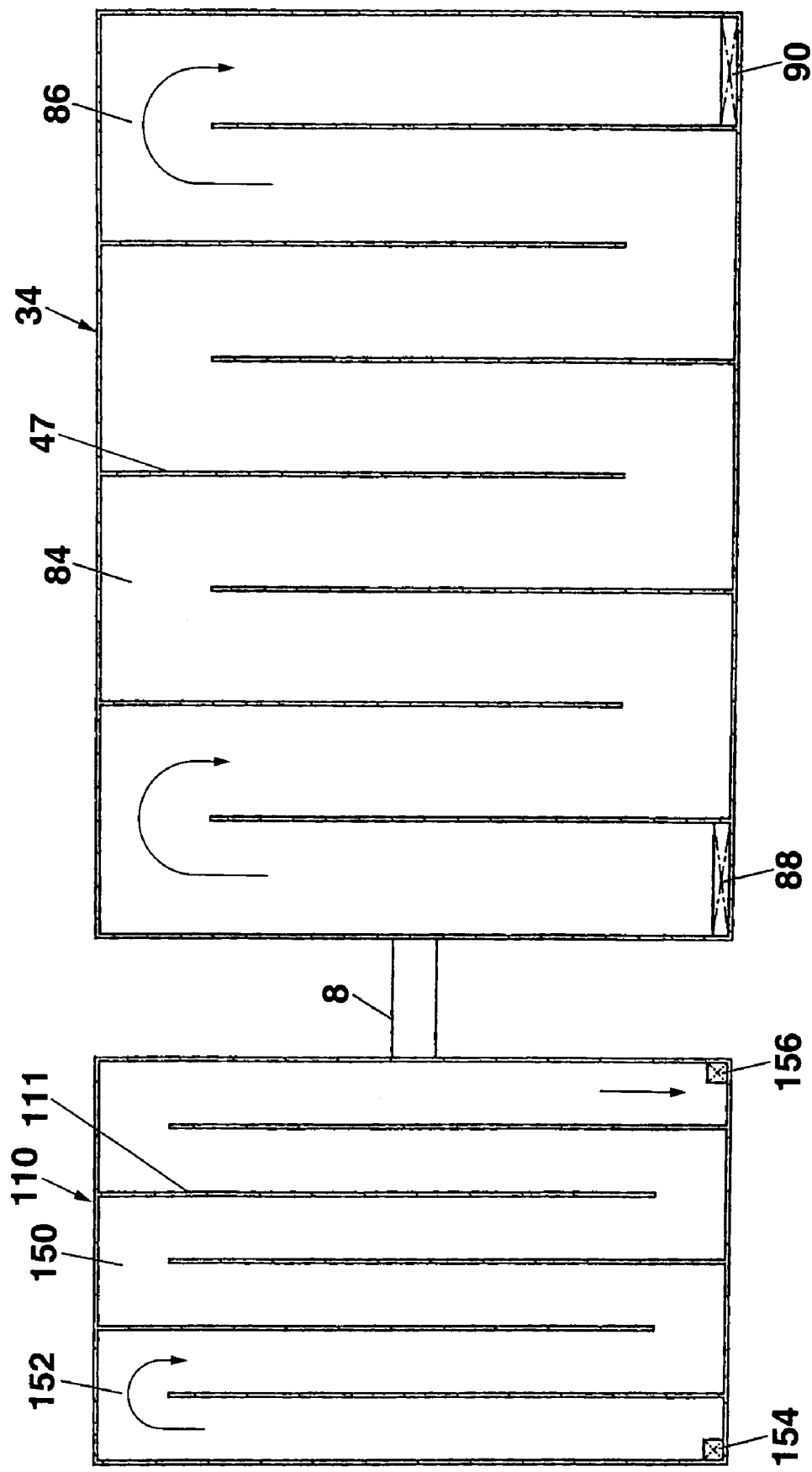
FIG. 10 is a cross sectional view taken along the section line X-X of FIG. 3.
Figure 11:
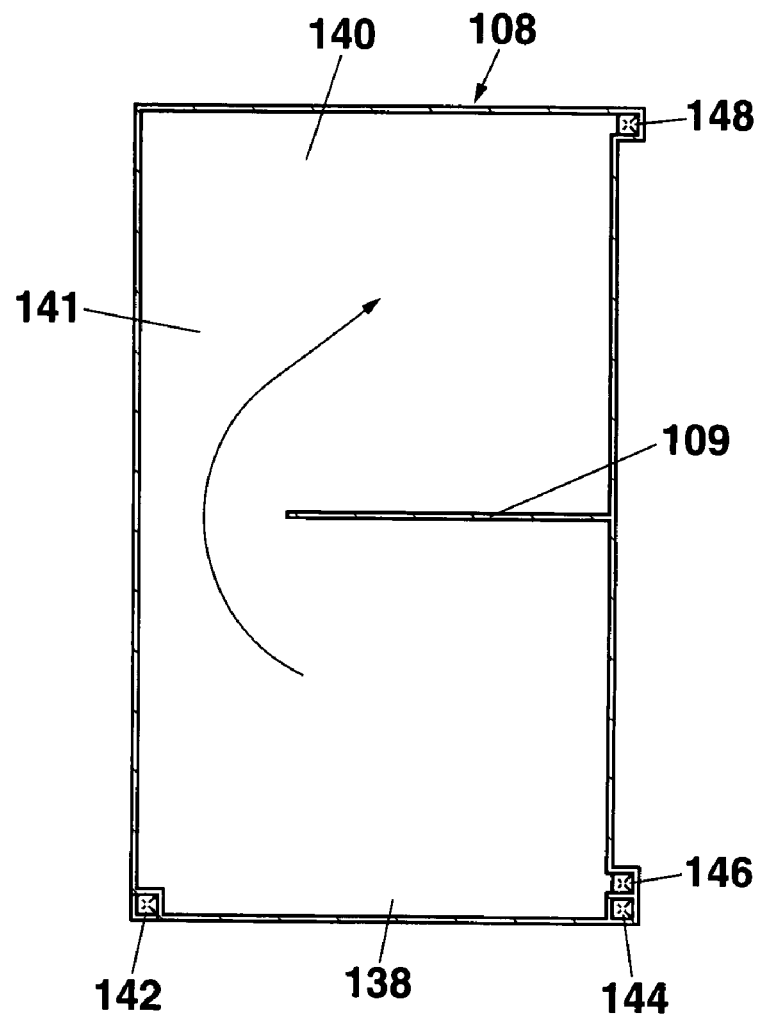
FIG. 11 is a cross sectional view taken along the section line XI-XI of FIG. 3.
Figure 12:
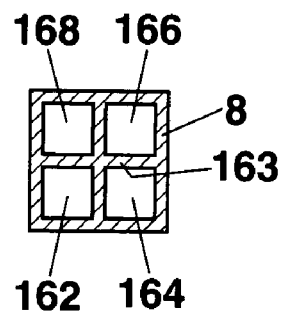
FIG. 12 is a cross sectional view taken along the section line XII-XII of FIG. 3.
Figure 13:
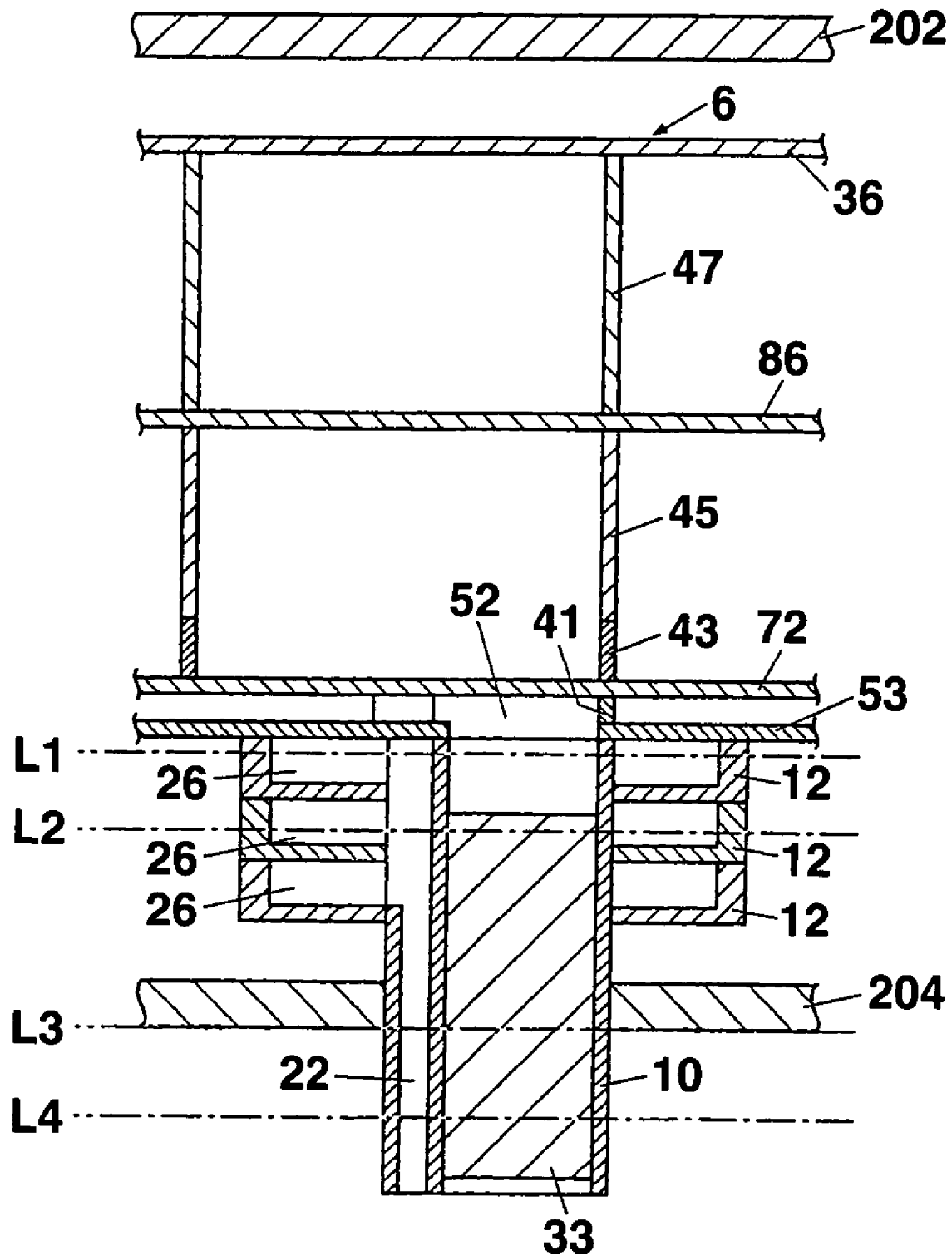
FIG. 13 is a cross sectional view taken along the section line XIII-XIII of FIG. 3.

The configurations of the supply and discharge unit 2, the high-temperature reaction unit 4, the low-temperature reaction unit 6, and the coupling pipe 8 will be in more detail with reference to FIGS. 3 and 5 to 13. FIG. 5 is an exploded perspective view of the microreactor module 1. FIGS. 6A and 6B are cross sectional views taken the direction of a plane of the combustor plate 12 (described further below) extending from the section line VI-VI of FIG. 3, and showing the states with an external flow pipe 10 and without the external flow pipe 10, respectively. FIG. 7 is a cross sectional view taken along the direction of respective planes of base plates 28 and 102 (described further below) extending from the section line VII-VII of FIG. 3. FIG. 8 is a cross sectional view taken along the direction of respective planes of lower frames 30 and 104 (described further below) extending from the section line VIII-VIII of FIG. 3. FIG. 9 is a cross sectional view taken along the direction of respective planes of central frames 32 and 106 (described further below) extending from the section line IX-IX of FIG. 3. FIG. 10 is a cross sectional view taken along the direction of respective planes of upper frames 34 and 110 (described further below) extending from the section line X-X of FIG. 3. FIG. 11 is a cross sectional view taken along the direction of a plane of a combustor plate 108 (described further below) extending from the section line XI-XI of FIG. 3. FIG. 12 is a cross sectional view taken along the direction of a plane perpendicular to a communication direction of the combustor plate 108 from the section line XII-XII of FIG. 3. FIG. 13 is a cross sectional view taken along the thickness direction of the low-temperature reaction unit 6 from the section line XIII-XIII of FIG. 3.

As shown in FIGS. 3, 5, 6 and 13, the supply and discharge unit 2 has an external flow pipe 10 formed of a metal material, such as stainless steel (SUS 304), having flexibility with respect to the thermal expansion and high thermal conductivity and corrosion resistance, and three combustor plates 12 laminated onto one another around the external flow pipe 10. The combustor plates 12 are joined to the external flow pipe 10 by hard soldering. In this case, the solder is desirably a material having a melting point of at least 700° C. or a melting point higher than a maximum one of temperatures of fluids flowing through the external flow pipe 10 or in contact with the combustor plates 12, for example. For example, the solder may be any one a gold solder composed of gold and silver, copper, zinc, and cadmium; solders having principal constituents of gold, silver, zinc, and nickel; and solders having principal constituents of gold, palladium, and silver.

The external flow pipe 10 is a tube having a plurality of flow paths that bring respective fluids in the microreactor module 1 to the outside of the microreactor module 1. More specifically, with reference to FIG. 6A, the external flow pipe 10 is provided with a vaporizing intake pathway 14, an air intake pathway 16, a combustion gas mixture intake pathway 18, an exhaust gas discharge pathway 20, a combustion gas mixture intake pathway 22, and a hydrogen discharge pathway 24 such that they are parallel to one another. The vaporizing intake pathway 14, the air intake pathway 16, the combustion gas mixture intake pathway 18, the exhaust gas discharge pathway 20, the combustion gas mixture intake pathway 22, and the hydrogen discharge pathway 24 are partitioned by a partition wall 29 of the external flow pipe 10. In this embodiment, the vaporizing intake pathway 14, the air intake pathway 16, the combustion gas mixture intake pathway 18, the exhaust gas discharge pathway 20, the combustion gas mixture intake pathway 22, and the hydrogen discharge pathway 24 are provided in the single external flow pipe 10. Alternately, the external flow pipe 10 may be such that all or some of the pathways 14, 16, 18, 20, 22 and 24 are provided in pipe members independent from one another, and the pipe members are bundled or assembled. The hydrogen discharge pathway 24 of the external flow pipe 10 is connected to a fuel electrode or pole of a power generation module 608 to be described later. The vaporization intake pathway 14 of the external flow pipe 10 is connected to a fuel container 604 through a flow control unit 606 to be described later.

The vaporization intake pathway 14 is filled in with a liquid absorptive material 33 (shown in FIG. 13), such as a felt material, ceramic porous material, fiber material, and carbon porous material. The liquid absorptive material 33 absorbs a liquid, and can be any one of formations, such as inorganic or organic fibers solidified by a binder material, inorganic particulate sintered, inorganic particulate solidified by a binder material, a mixture of graphite and glassy carbon.

The combustor plates 12 as well are formed of a metal material, such as stainless steel (SUS 304) having high corrosion resistance. A through-hole 27 is formed in a central portion of the combustor plates 12. The external flow pipe 10 is inserted through the through-holes 27, and fixed to the combustor plates 12. Further, a partition wall 31 is protrusively provided to one of upper and lower faces of the combustor plate 12 (upper surface in the present embodiment). The partition wall 31 has two portions. One portion (rectangular frame) is provided along the overall outer periphery of the combustor plate 12, and the other portion is radially extended between one wall portion of a rectangular frame and one side of the external flow pipe 10. The three combustor plates 12 are fixedly laminated onto one another with a gape therebetween by soldering around the external flow pipe 10, and an upper surface of the partition wall of the uppermost combustor plate 12 is joined to a lower face of the low-temperature reaction unit 6. Thereby, combustion flow pathways 26 respectively shielded from the outside are formed in spacings formed by the combustor plates 12. An inlet end portion of each combustion flow pathway 26 horizontally extending in a substantially U-shape communicates with the combustion gas mixture intake pathway 22. In addition, an outlet end portion of each combustion flow pathway 26 communicates with the exhaust gas discharge pathway 20 (an opening is formed in a respective portion corresponding to the flow pathway 26 on one side of the rectangles where the pathways 22 and 20 are formed). A combustion catalyst for combusting the combustion gas mixture is included in a part or on substantially the overall wall face of each of the combustion flow pathways 26. Platinum or the like is used as the combustion catalyst.

The liquid absorptive material 33 in the external flow pipe 10 fills to a position around which the combustor plates 12 exist.

As shown in FIGS. 3 and 5, the low-temperature reaction unit 6 is formed in a rectangular parallelepiped shape in the manner that the base plate 28, the lower frame 30, the central frame 32, the upper frame 34, and a cover plate 36 are overlaid in this order from the bottom. The base plate 28, the lower frame 30, the central frame 32, the upper frame 34, and the cover plate 36 are formed of a metal material, such as stainless steel (SUS 304) having high corrosion resistance.

In a central portion of the base plate 28 in the width direction, the external flow pipe 10 and the uppermost combustor plate 12 are joined to the lower face of a bottom plate 53 of the base plate 28. With reference to FIG. 7, a partition wall 41 is protrusively provided in the interior surrounded by a peripheral portion of the upper surface of the bottom plate 53 of the base plate 28 and the peripheral portion thereof. Thereby, a gas mixture flow pathway 38, a mixture flow pathway 40, a carbon monoxide removal flow pathway 42, a carbon monoxide removal flow pathway 44 of a zigzag shape, a U-shaped carbon monoxide removal flow pathway 46, a combustion gas mixture flow pathway 48, and an exhaust gas flow pathway 50 are formed segmental from one another. A through-hole 52 is provided in an inlet end portion of the gas mixture flow pathway 38. Thereby, the gas mixture flow pathway 38 is communicated with the vaporization intake pathway 14 of the external flow pipe 10 through the through-hole 52. The carbon monoxide removal flow pathway 46 surrounds the through-hole 52, and a through-hole 54 is provided in an outlet end portion of the carbon monoxide removal flow pathway 46. Thereby, the carbon monoxide removal flow pathway 46 is communicated with the hydrogen discharge pathway 24 through the through-hole 54. A through-hole 58 is provided in an outlet end portion of the combustion gas mixture flow pathway 48, whereby the combustion gas mixture flow pathway 48 is communicated with the combustion gas mixture intake pathway 18 through the through-hole 58. A through-hole 56 is provided in an inlet end portion of the exhaust gas flow pathway 50, whereby the exhaust gas flow pathway 50 is brought in communication with the exhaust gas discharge pathway 20 through the through-hole 56. A through-hole 60 is provided in an outlet end portion of the mixture flow pathway 40, whereby the mixture flow pathway 40 is communicated with the air intake pathway 16 through the through-hole 60. The through-holes 52, 54, 56, 58, and 60 are formed respectively in predetermined portions of the bottom plate 53 to vertically penetrate the plate.

With reference to FIG. 8, a partition wall 43 is provided on the inner side of the lower frame 30. Thereby, the inner side of the lower frame 30 is segmented into a carbon monoxide removal flow pathway 62 of a zigzag shape, a swirl-shaped carbon monoxide removal flow pathway 64, a well hole 66, a combustion gas mixture flow pathway 68, and an exhaust gas flow pathway 70. A bottom plate 72 is provided in the carbon monoxide removal flow pathway 64, the combustion gas mixture flow pathway 68, and the exhaust gas pathway 70. In the state that the lower frame 30 is joined by soldering or the like manner to the base plate 28, the bottom plate 72 covers the side above the gas mixture flow pathway 38, the mixture flow pathway 40, the carbon monoxide removal flow pathway 46, the combustion gas mixture flow pathway 48, and the exhaust gas flow pathway 50. An inlet end portion 64a of the carbon monoxide removal flow pathway 64 is in communication with an outlet end portion of the carbon monoxide removal flow pathway 62. A well hole 74 in communication with the carbon monoxide removal flow pathway 42 of the base plate 28 is formed midway of the carbon monoxide removal flow pathway 64 (that is, the bottom plate 72 does not exist). In addition, a well hole 76 in communication with the exhaust gas flow pathway 50 of the base plate 28 is formed in an outlet end portion 64b of the carbon monoxide removal flow pathway 64. In order that, in the plan view state, the carbon monoxide removal flow pathway 62 corresponds to the carbon monoxide removal flow pathway 44 of the base plate 28, the partition wall 43 and the partition wall 41 that define those flow pathways are overlapped with each other. Consequently, the carbon monoxide removal flow pathway 62 and the carbon monoxide removal flow pathway 44 are put into a well state. The well hole 66 is located in one portion of the mixture flow pathway 40 of the base plate 28. A well hole 69 is formed in one portion of the combustion gas mixture flow pathway 68, whereby the combustion gas mixture flow pathway 68 is communicated with the combustion gas mixture flow pathway 48 of the base plate 28 through the well hole 69. A well hole 71 is formed in one portion of the exhaust gas pathway 70, whereby the exhaust gas pathway 70 is communicated with the exhaust gas flow pathway 50 of the base plate 28 through the well hole 71.

In the plan view, the construction is in the state where the external flow pipe 10 overlaps a portion of the carbon monoxide removal flow pathway 64, and the carbon monoxide removal flow pathway 64 swirls around the external flow pipe 10.

With reference to FIG. 9, a partition wall 45 is provided on the inner side of the central frame 32. Thereby, the inner side of the central frame 32 is segmented into a carbon monoxide removal flow pathway 78 of a zigzag shape, a swirl-shaped carbon monoxide removal flow pathway 80, and a well hole 82. A bottom plate 83 is provided in a part of the carbon monoxide removal flow pathway 80. In the state that the central frame 32 is joined by soldering or the like manner to the lower frame 30, the bottom plate 83 covers the side above the combustion gas mixture flow pathway 68 and the exhaust gas flow pathway 70 of the lower frame 30. In order that, in the plan view state, the carbon monoxide removal flow pathway 78 corresponds to the carbon monoxide removal flow pathway 62 of the lower frame 30, the partition wall 45 overlaps the partition wall 43. Thereby, the carbon monoxide removal flow pathway 78 and the carbon monoxide removal flow pathway 62 are put into a well state. In order that, in the plan view state, the carbon monoxide removal flow pathway 80 corresponds to the carbon monoxide removal flow pathway 64 of the lower frame 30 (that is, no wall is provided between the flow pathways 64, 80), and the partition wall 45 overlaps the partition wall 43. Thereby, the carbon monoxide removal flow pathway 80 and the carbon monoxide removal flow pathway 64 are put into a well state (no wall is provided between the flow pathways 64, 80). The well hole 82 overlaps the well hole 66 of the lower frame 30, whereby the well hole 82 and the well hole 66 are put into the communication state.

With reference to FIG. 10, a partition wall 47 is provided on the inner side of the upper frame 34, whereby a carbon monoxide removal flow pathway 84 of a zigzag shape is formed on the inner side of the upper frame 34. A bottom plate 86 is provided entirely of the inner side of the upper frame 34. In the state that the upper frame 34 is joined by soldering or the like manner to the central frame 32, the bottom plate 86 of the upper frame 34 covers the side above the carbon monoxide removal flow pathway 78 and the carbon monoxide removal flow pathway 80 of the central frame 32. In addition, a well hole 88 is formed in an inlet end portion of the carbon monoxide removal flow pathway 84, and a well hole 90 is formed in an outlet end portion of the carbon monoxide removal flow pathway 84. The well hole 88 overlaps the well hole 82 of the central frame 32. Thereby, the carbon monoxide removal flow pathway 84 is communicated with the mixture flow pathway 40 through the well hole 88, the well hole 82, and the well hole 66. The well hole 90 is located above the end portion of the carbon monoxide removal flow pathway 78 of the central frame 32, whereby the carbon monoxide removal flow pathway 84 is communicated with the carbon monoxide removal flow pathway 78 through the well hole 90.

As shown in FIG. 5, the cover plate 36 is joined to an upper surface of the upper frame 34, so that the side above the carbon monoxide removal flow pathway 84 is covered with the cover plate 36. A carbon-monoxide selective oxidation catalyst for selectively oxidizing the carbon monoxide is entirely provided to the inner surfaces of the walls of the carbon monoxide removal flow pathways 42, 44, 46, 62, 64, 78, 80 and 84. The carbon-monoxide selective oxidation catalyst is provided to predetermined portions of the base plate 28, the lower frame 30, the central frame 32, and the upper frame 34, which form the wall faces, before the plate and frames are joined to one another. For example, platinum is used as the carbon-monoxide selective oxidation catalyst.

As shown in FIGS. 3 and 5, the high-temperature reaction unit 4 is formed in a rectangular parallelepiped shape in the manner that the base plate 102, the lower frame 104, the central frame 106, the combustor plate 108, the upper frame 110, and the cover plate 112 are overlaid in this order from the bottom. The base plate 102, the lower frame 104, the central frame 106, the upper frame 110, the combustor plate 108, and the cover plate 112 are formed of a metal material, such as stainless steel (SUS 304) having high corrosion resistance.

With reference to FIG. 7, the base plate 102 has a bottom plate 113 and a partition wall 103 is protrusively provided on upper surfaces of a peripheral portion of the bottom plate 113 and in the interior thereof. Thereby, the interior is segmented into a supply flow pathway 114, a reformer flow pathway 116 of a zigzag shape, and a discharge flow pathway 115. The supply flow pathway 114 is continued to the reforming flow pathway 116, while the discharge flow pathway 115 is independent of the supply flow pathway 114 and the reforming flow pathway 116.

With reference to FIG. 8, a partition wall 105 is provided on the inner side of the lower frame 104. Thereby, the inner side of the lower frame 104 is segmented into a reforming flow pathway 118 of a zigzag shape, a combustion gas mixture flow pathway 120, an exhaust gas flow pathway 122, and a well hole 124. A bottom plate 126 is provided to the combustion gas mixture flow pathway 120 and the exhaust gas flow pathway 122. In the state that the lower frame 104 is joined to the base plate 102, the bottom plate 126 covers the side above the supply flow pathway 114 and the discharge flow pathway 115 of the base plate 102. In order that, in the plan view state, the reforming flow pathway 118 corresponds to the reforming flow pathway 116 of the base plate 102, the partition wall 105 overlaps the partition wall 103. Thereby, the reforming flow pathway 118 and the reforming flow pathway 116 are put into a well state (the bottom plate 126 does not exist therebetween).

With reference to FIG. 9, a partition wall 107 is provided on the inner side of the central frame 106. Thereby, the inner side of the central frame 106 is segmented into a reforming flow pathway 128 of a zigzag shape, a well hole 130, a well hole 132, and a well hole 134. In addition, a bottom plate 136 is provided in the inner side of the central frame 106. In the state that the central frame 106 is joined to the lower frame 104 thereon, the bottom plate 136 covers the side above the combustion gas mixture flow pathway 120 and the exhaust gas flow pathway 122 of the lower frame 104. In order that, in the plan view state, the reforming flow pathway 128 corresponds to the reforming flow pathway 118 of the lower frame 104, the partition wall 107 overlaps the partition wall 105. Thereby, the reforming flow pathway 128 and the reforming flow pathway 118 are put into a well state. The well hole 130 overlaps the well hole 124 of the lower frame 104, whereby both well holes 130, 124 are put into a blow-thorough state. The well hole 132 is located above the end portion of the combustion gas mixture flow pathway 12C. The well hole 134 is located above the end portion of the exhaust gas flow pathway 122.

As shown in FIGS. 3 and 5, in the state that the combustor plate 108 is joined onto the central frame 106 thereon, the side above the reforming flow pathway 128 of the central frame 106 is covered with the combustor plate 108. With reference to FIG. 11, the combustor plate 108 has a bottom plate 141, and a partition wall 109 is protrusively provided the periphery and inner upper surface of the bottom plate 141. Thereby, the interior is segmented into a combustion chamber 138, a combustion chamber 140, and a well hole 142, and a well hole 144. A well hole 146 is formed at the end portion of the combustion chamber 138, and located above the well hole 132 of the central frame 106. Thereby, the combustion chamber 138 is communicated with the combustion gas mixture flow pathway 120 of the lower frame 104 through the well holes 132, 146. Both combustion chambers 138, 140 are in communication with each other. A well hole 148 is formed at the end portion of the combustion chamber 140, and located above the well hole 134 of the central frame 106. Thereby, the combustion chamber 140 is communicated with the exhaust gas flow pathway 122 of the lower frame 104 through the well holes 134, 148. The well hole 142 is located above the end portion of the reforming flow pathway 128 of the central frame 106, whereby the well hole 142 is communicated with the reforming flow pathway 128. The well hole 144 is located above the well hole 130 of the center frame 106, whereby the well hole 144 is communicated with the well hole 130. A combustion catalyst for combusting the combustion gas mixture is provided to the wall faces of both combustion chambers 138 and 140. The combustion catalyst is provided in advance to predetermined portions of the combustor plate 108 and the upper frame 110, which form the wall faces. As the combustion catalyst, platinum or the like is used.

With reference to FIG. 10, a partition wall 111 is provided in the inner side of the upper frame 110, whereby a reforming flow pathway 150 of a zigzag shape is formed in the inner side of the upper frame 110. In addition, a bottom plate 152 is provided to the upper frame 110. The upper frame 110 is joined by soldering or the like manner onto the combustor plate 108, whereby the side above the combustion chambers 138, 140 of the combustor plate 108 is covered. A well hole 154 is provided at an outlet end portion of the reforming flow pathway 150, and a well hole 156 is provided at an inlet end portion of the reforming flow pathway 150. The well holes 154 and 156 are formed in the bottom plate 152. The well hole 154 is located above the well hole 142 of the combustor plate 108, whereby the reforming flow pathway 150 is communicated with the reforming flow pathway 128 of the center frame 106 through the well holes 142, 154. The other well hole 156 is located above the well hole 144 of the combustor plate 108, whereby the reforming flow pathway 150 is communicated with the discharge flow pathway 115 through the well holes 124, 130, 144, 156.

As shown in FIG. 5, in the state that the cover plate 112 is joined by soldering or the like manner onto the upper frame 110, the side above the reforming flow pathway 150 is covered with the cover plate 112. A reforming catalyst for generating hydrogen by reforming the fuel is provided to the wall faces of the supply flow pathway 114, the discharge flow pathway 115, and reforming flow pathways 116, 118, 128 and 150. A combustion catalyst is provided in advance to predetermined portions of the base plate 102, the lower frame 104, the central frame 106, the combustor plate 108, the upper frame 110 and the cover plate 112, which form wall faces, before plates and frames are joined to one another. Usable examples of the reforming catalyst for methanol reformation include a Cu/ZnO based catalyst and Pd/ZnO based catalyst.

As shown in FIGS. 3 and 4, the outer profile of the coupling pipe 8 is angled columnar, and the width of the coupling pipe 8 is smaller than the width of the high-temperature reaction unit 4 and the width of the low-temperature reaction unit 6. Also, the height of the coupling pipe 8 is smaller than the width of any one of the high-temperature reaction unit 4 and the low-temperature reaction unit 6. More specifically, in terms of projected area sizes along the length direction of the coupling pipe 8, namely, the length direction Y, the coupling pipe 8 is smaller than any one of the high-temperature reaction unit 4 and the low-temperature reaction unit 6. Accordingly, heat is hardly transferred from the high-temperature reaction unit 4 to the low-temperature reaction unit 6 through the coupling pipe 8.

The coupling pipe 8 is interposed as a bridge between the high-temperature reaction unit 4 and the low-temperature reaction unit 6. The coupling pipe 8 is joined by soldering or the like to the widthwise central portions or lateral walls of the low-temperature and high-temperature reaction units 4, 6. The lower face of the coupling pipe 8 is flush with the lower face of the high-temperature reaction unit 4, that is, the lower face of the base plate 102, and is further flush with the lower face of the low-temperature reaction unit 6, that is, the lower face of the base plate 28.

The coupling pipe 8 is only one interposed as a bridge coupling between the high-temperature reaction unit 4 and the low-temperature reaction unit 6, that is, no other component is provided in such a manner to couple therebetween.

As shown in FIGS. 7, 8 and 12, four coupling flow pathways 162, 164, 166 and 168 are provided parallel to one another in the coupling pipe 8. The flow pathways 162, 164, 166 and 168 are partitioned by a partition wall 163 of the coupling pipe 8 to be independent of one another. As shown in FIG. 7, an inlet end of the first coupling flow pathway 162 is in communication with the gas mixture flow pathway 38, and an outlet end of the flow pathway 162 is in communication with the supply flow pathway 114. In addition, an inlet end of the second coupling flow pathway 164 is in communication with the discharge flow pathway 115, and an outlet end of the flow pathway 164 is in communication with the mixture flow pathway 40. Likewise, as shown in FIG. 8, an inlet end of the third coupling flow pathway 166 is in communication with the combustion gas mixture flow pathway 68, and an outlet end of the flow pathway 166 is in communication with the combustion gas mixture flow pathway 120. In addition, an inlet end of the fourth coupling flow pathway 168 is in communication with the exhaust gas flow pathway 122, and an outlet end of the flow pathway 168 is in communication with the exhaust gas pathway 70.

As described above, while the four coupling flow pathways 162, 164, 166 and 168 are provided internally of the single coupling pipe 8, each or some groups of the coupling flow pathways 162, 164, 166 and 168 can be provided in separate pipe members, and the pipe members can be bundled. The coupling pipe 8 is desirably formed of the same material as that of the base plate 28, the lower frame 30, the base plate 102, and the lower frame 104.

As described above, in the supply and discharge unit 2, the high-temperature reaction unit 4, the low-temperature reaction unit 6, and the coupling pipe 8, the flow pathways are partitioned by the partition wall or walls (including the bottom plates, top plates, side plates, and outer plates). In any portion, the thickness of the partition wall falls in a range of 0.1 mm or more and 0.2 mm or less, and preferably 0.1 mm. More specifically, in the high-temperature reaction unit 4, the partition wall 103 of the base plate 102, the partition wall 105 of the lower frame 104, and the partition wall 107 of the central frame 106, which are respectively located in the inner side to overlap one another in the plane direction, whereby the meandering or zigzag sidewalls are formed. By these sidewalls, and in addition, by the upper face of the bottom plate 113 of the base plate 102 and the lower face of the bottom plate 141 of the combustor plate 108, the reforming flow pathway 116, the supply flow pathway 114, and the discharge flow pathway 115 are partitioned. In addition, the combustion chambers 138 and 140 are respectively partitioned by the upper face of the bottom plate 141 of the combustor plate 108, the partition wall 109, and the lower face of the bottom plate 152 of the upper frame 110. Further, the reforming flow pathway 150 is partitioned by the upper face of the bottom plate 152 of the upper frame 110, the partition wall 111, and the lower face of the cover plate 112.

In the low-temperature reaction unit 6, the partition wall 41 of the base plate 28, the partition wall 43 of the lower frame 30, and the partition wall 45 of the central frame 32 are located in the inner side to overlap one another in the plane direction, whereby the meandering or zigzag sidewalls are formed. By these sidewalls, and in addition, by the upper face of the bottom plate 53 of the base plate 28 and the bottom plate 86 of the upper frame 34, the respective flow pathways are partitioned. Further, the carbon monoxide removal flow pathway 84 is partitioned by the upper face of the bottom plate 86 of the upper frame 34, the partition wall 47, and the lower face of the cover plate 36.

Figure 14:
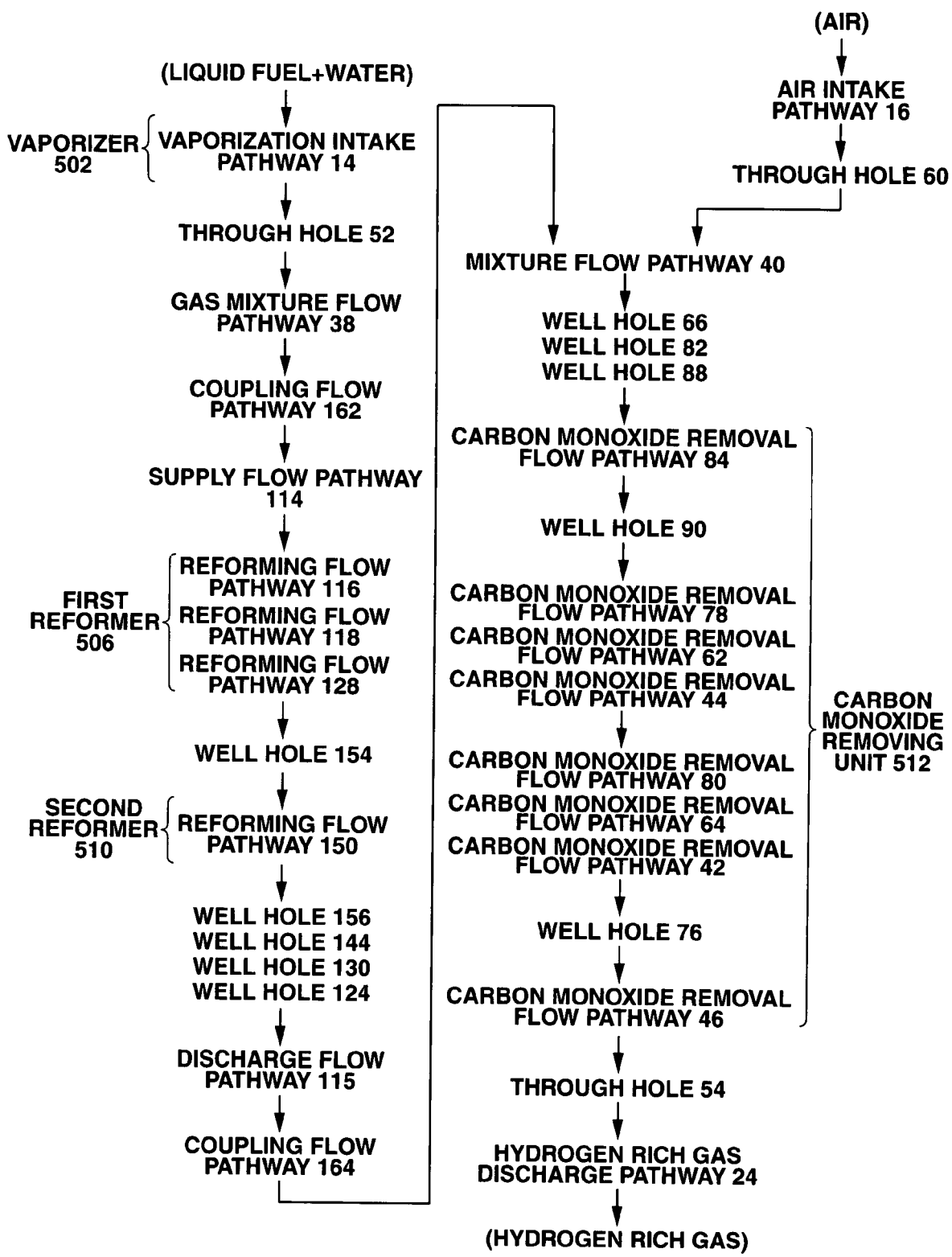
FIG. 14 is a view showing a route from the stage of supply of a liquid fuel and water to the stage of discharging of a product or hydrogen rich gas.
Figure 15:
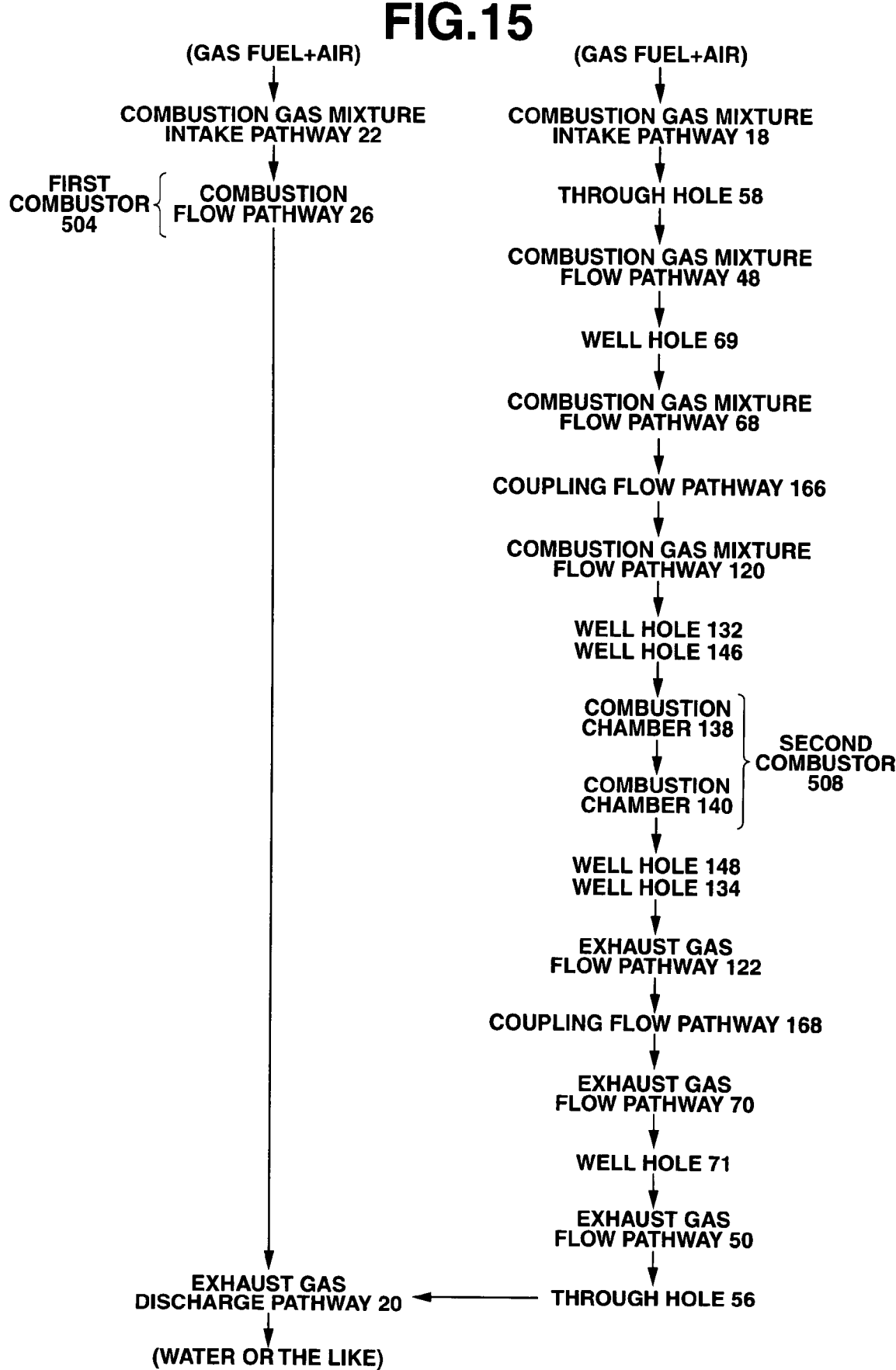
FIG. 15 is a view showing a route from the stage of supply of a combustion gas mixture to the stage of discharging a product such as water.

The configuration is formed as described above, whereby routes of the flow pathways on the inner sides of the supply and discharge unit 2, the high-temperature reaction unit 4, the low-temperature reaction unit 6, and the coupling pipe 8 are as shown in FIGS. 14 and 15. The correlation between the FIGS. 14 and 15 and FIG. 4 are described here.

The vaporization intake pathway 14 corresponds to the flow pathway of the vaporizer 502; the reforming flow pathways 116, 118 and 128 correspond to the flow pathway of the first reformer 506; the reforming flow pathway 150 corresponds to the flow pathway of the second reformer 510; the flow pathway from the start end of the carbon monoxide removal flow pathway 84 to the terminal end of the carbon monoxide removal flow pathway 46 corresponds to the flow pathway of the carbon monoxide removing unit 512; the combustion pathway 26 corresponds to the flow pathway of the first combustor 504; and combustion chambers 138 and 140 correspond to the combustion chambers of the second combustor 508.

Referring to FIGS. 2 and 5, an insulating film (not shown) of silicon nitride, silicon oxide or the like is formed entirely of the lower face of the low-temperature reaction unit 6, that is, the lower face of the base plate 28, the lower face of the high-temperature reaction unit 4, that is, the lower face of the base plate 102, and the lower face of the coupling pipe 8. On a portion of the lower face of the insulating film on the side of the low-temperature reaction unit 6, a heating wire 170 is patterned in a meandering state so that, in the plan view, the heating wire 170 overlaps at least a part of the flow pathway of the carbon monoxide removing unit 512. On a lower face of a part of the insulation film extending from the low-temperature reaction unit 6 to the high-temperature reaction unit 4 through the coupling pipe 8, the heating wire 172 is patterned in a meandering state so that, in the plan view, the heating wire 172 overlaps at least a part of the flow pathways of the first reformer 506 and the second reformer 510. An insulating film (not shown) of silicon nitride, silicon oxide or the like is formed also on the lateral surfaces of the external flow pipe 10 and the surface of the combustor plates 12. A heating wire 174 is patterned on a region from the lower face of the low-temperature reaction unit 6 to the lateral surfaces of the external flow pipe 10 through the surface of the supply and discharge unit 2. The heating wires 170, 172 and 174 are each formed in the manner that an adhesive layer (optional), an anti-diffusion layer and an exothermic layer are laminated in this order from the side of the insulating film. The exothermic layer is formed of a material (Au, for example) having a lowest resistivity among the three layers. When voltage is applied to the respective heating wires 170, 172 and 174, current concentrically flows to the exothermic layer, whereby heat is generated. The anti-diffusion layer is formed of a material that is less thermally diffusive to the anti-diffusion layer even when the respective heating wires 170, 172 and 174 are exothermic, and is less thermally diffusive to the exothermic layer. It is desirable to use a material (W, for example) that has relatively high melting point and low reactivity. The adhesive layer is used in the case where the anti-diffusion layer has low adherence and is prone to separation, so that the adhesive layer is formed using a material (Ta, Mo, Ti, or Cr, for example) having high adherence to either the anti-diffusion layer or the insulating film. The heating wire 170 heats the low-temperature reaction unit 6 at the time of activation. The heating wire 172 heats the high-temperature reaction unit 4 and the coupling pipe 8 at the time of activation. The heating wire 174 heats the vaporizer 502 and the first combustor 504 of the supply and discharge unit 2. Thereafter, when the second combustor 508 has combusted with off gases containing hydrogen from the fuel cell, the heating wire 172 works as an auxiliary heating member of the second combustor 508, thereby to heat the high-temperature reaction unit 4 and the coupling pipe 8. Similarly, when the first combustor 504 combusted with off gases containing hydrogen from the fuel cell, the heating wire 170 works as an auxiliary of the first combustor 504, thereby to heat the low-temperature reaction unit 6.

Further, the heating wires 170, 172 and 174 each function as a temperature sensor capable of reading a temperature value from a resistance value against a predetermined applied voltage as the electrical resistance varies depending on the temperature. That is, the temperatures of the heating wires 170, 172 and 174 are proportional to the electrical resistance.

The end portion of any one of the respective heating wires 170, 172 and 174 is located on the lower face of the base plate 28, and the end portions are arranged in such a manner as to surround the combustor plates 12. Two end portions of the heating wire 170 are, respectively, connected to lead wires 176 and 178; two end portions of the heating wire 172 are, respectively, connected to lead wires 180 and 182; and two end portions of the heating wire 174 are, respectively, connected to lead wires 184 and 186. In FIG. 3, the heating wires 170, 172 and 174 and lead wires 176, 178, 180, 182, 184 and 186 are not shown for the sake of brevity.

Figure 16:
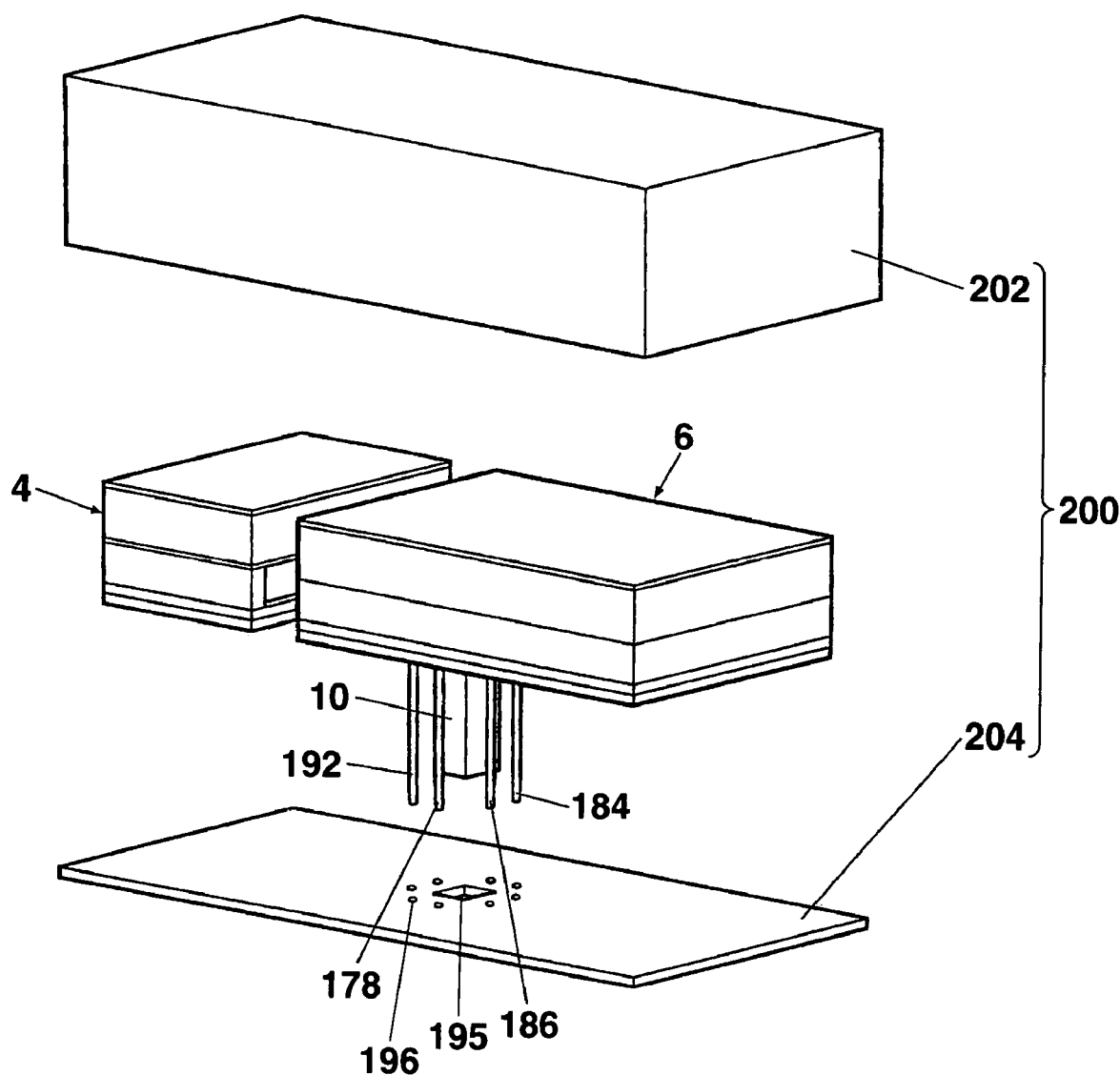
FIG. 16 is an exploded perspective view of a heat insulating package of the microreactor module.
Figure 17:
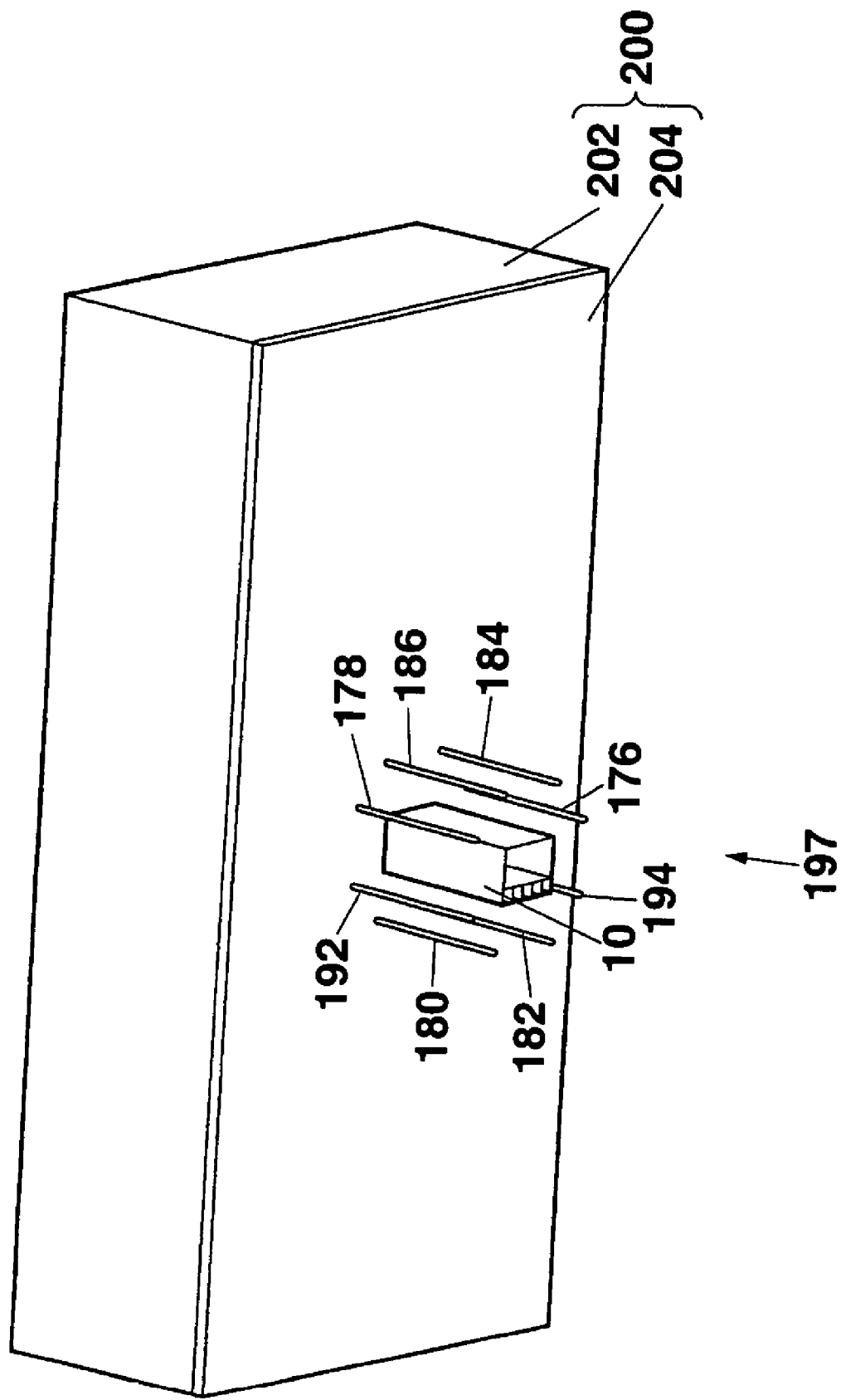
FIG. 17 is a perspective view of the heat insulating package as viewed from a slant lower side.

With reference to FIGS. 16 and 17, the microreactor module 1 includes a heat insulating package 200. The high-temperature reaction unit 4, the low-temperature reaction unit 6, and the coupling pipe 8 are accommodated in the heat insulating package 200. The heat insulating package 200 is configured to include a rectangular box body 202 with a lower face having an opening, and a base plate 204 closing the opening of the lower face of the box body 202. The base plate 204 is joined to the box body 202 by using a glass material or an insulative seal material. Either the box body 202 or the base plate 204 is formed from a heat insulating material such as glass or ceramic, and an inner face thereof is formed with a metallic reflection film of aluminum, gold, or the like. With the metallic reflection film thus formed, heat of radiation from the supply and discharge unit 2, the high-temperature reaction unit 4, the low-temperature reaction unit 6, and the coupling pipe 8 is reflected, thereby restraining heat from propagating to the outside of the heat insulating package 200. An interior space between the heat insulating package 200 and the microreactor module 1 is vacuum pumped so that the internal pressure of the heat insulating package 200 is maintained at 1 Torr or lower. The external flow pipe 10 of the supply and discharge unit 2 is provided to expose in part from the heat insulating package 200. The external flow pipe 10 thus provided is coupled to a fuel electrode of the power generation module 608 (described further below), and is further coupled to the fuel container 604 through the flow control unit 606. The lead wires 176, 178, 180, 182, 184 and 186, respectively, are exposed in parts from the heat insulating package 200. The external flow pipe 10 and the lead wires 176, 178, 180, 182, 184 and 186, respectively, are joined to corresponding holes 196 formed in the base plate 204 of the heat insulating package 200 by using a glass material or an insulative seal material. This is done to prevent the occurrence of such gaps as to permit outside air to enter the inside of the heat insulating package 200 from the portions of the external flow pipe 10 and the respective lead wires 176, 178, 180, 182, 184 and 186 exposed from the heat insulating package 200 to thereby lead to an increase in the internal pressure. Since the internal pressure in the inner space of the heat insulating package 200 can be maintained low, a medium for propagating the heat generated by the microreactor module 1 is diluted to thereby be able to restrain thermal convection in the interior space. Consequently, heat insulating effects of the microreactor module 1 are enhanced.

In the space sealed with the heat insulating package 200, the coupling pipe 8 having a predetermined length is interposed between the high-temperature reaction unit 4 and the low-temperature reaction unit 6 of the microreactor module 1, as described above. However, the volume of the coupling pipe 8 is very small relative to the respective volumes of the high and low-temperature reaction units 4, 6. For this reason, propagation of heat through the coupling pipe 8 from the high-temperature reaction unit 4 to the low-temperature reaction unit 6 can be restrained. Concurrently, in the space between the high-temperature reaction unit 4 and the low-temperature reaction unit 6, thermal gradients necessary for the reactions can be maintained, and the temperature in the high and low-temperature reaction units 4, 6 can be easily homogenized.

With reference to FIGS. 3 and 5, a getter material 188 is provided to the surface of the low-temperature reaction unit 6. The getter material 188 absorbs and thereby removes substances causing the pressure rise in the interior space of the heat insulating package 200 therefrom. The substance includes, for example, fluids possibly leaking over time or sequentially from the microreactor module 1, fluids sequentially occurring from microreactor module 1, part of outside air remained as the result of insufficient vacuum-pumping at the time of joining the box body 202 and the base plate 204, and outside air entering the inside of the heat insulating package 200. A heater such as a heating material is provided to the getter material 188, and a wiring 190 (FIG. 2) is coupled to the heater. Both end portions of the wiring 190 are located on the lower face of the base plate 102 around the combustor plates 12, and lead wires 192 and 194 are coupled to the respective two end portions of the wiring 190. The getter material 188 is activated by being heated to thereby exhibit absorption effects. Usable materials for the getter material 188 are alloys having a principal constituent of zirconium, barium, or titanium. Meanwhile, FIG. 3 does not show the wiring 190 and the lead wires 192 and 194 for the sake of gravity. The lead wires 192 and 194 are exposed in part from the heat insulating package 200 through two of the openings 196 formed in the base plate 204 of the heat insulating package 200. The lead wires 192 and 194 thus arranged are joined in the hole via the glass material or insulative seal material to the base plate 204 to prevent the occurrence of such gaps as to permit outside air causing the interior pressure rise to enter the inside of the heat insulating package 200 from the exposed portions. In this case, it is desirable that a group of wires 197 including the lead wires 176, 178, 180, 182, 184, 186, 192 and 194 is arranged around the external flow pipe 10 such that the respective lead wires are spaced apart from one another at equal spaces.

The plurality of through-holes 195 and 196 penetrate the base plate 204, and the corresponding through-holes 196 are sealed with the glass material or insulative seal material in the state that the external flow pipe 10 and the lead wires 176, 178, 180, 182, 184, 186, 192 and 194 are inserted into the corresponding through-holes 196. The interior space of the heat insulating package 200 is hermetically sealed, and the interior space is rendered to the vacuum pressure, so that the heat insulating effects can be enhanced. As a consequence, heat losses can be minimized.

The external flow pipe 10 is formed to protrusively extend to both the inner side and the outer side of the heat insulating package 200. According to this arrangement, the external flow pipe 10 is arranged in the state that it elevates as a support with respect the base plate 204 on the inner side of the heat insulating package 200. The high-temperature reaction unit 4, the low-temperature reaction unit 6, and the coupling pipe 8 are supported by the external flow pipe 10, and the high-temperature reaction unit 4, the low-temperature reaction unit 6, and the coupling pipe 8 are situated apart from the inner face of the heat insulating package 200.

Preferably, in the plan view, the external flow pipe 10 is joined to the lower face of the low-temperature reaction unit 6 in the center (center of gravity) of the gross configuration of the high-temperature reaction unit 4, the low-temperature reaction unit 6, and the coupling pipe 8.

Suppose that the external flow pipe 10 and the lead wires 176, 178, 180, 182, 184, 186, 192 and 194 are provided to the high-temperature reaction unit 4. In this case, the high-temperature reaction unit 4 has to be maintained at high temperature during operation, so that even the external flow pipe 10 and the lead wires 176, 178, 180, 182, 184, 186, 192 and 194 are heated to the high temperature. For this reason, there occurs an increase in the amount of heat transferring and running to the heat insulating package 200 from the external flow pipe 10 and the lead wires 176, 178, 180, 182, 184, 186, 192 and 194. However, in this embodiment, the external flow pipe 10 and the lead wires 176, 178, 180, 182, 184, 186, 192 and 194 are provided to the low-temperature reaction unit 6. Thereby, the amount of heat transferring and running to the heat insulating package 200 from the external flow pipe 10 and the lead wires 176, 178, 180, 182, 184, 186, 192 and 194 is reduced. Concurrently, in the external flow pipe 10 and the lead wires 176, 178, 180, 182, 184, 186, 192 and 194, an amount of heat dissipated from the portions exposed to the outside of the heat insulating package 200 is reduced, so that the high-temperature reaction unit 4 and the low-temperature reaction unit 6 can be heated in a reduced time, and it is possible to facilitate maintaining the heating temperature to be stable.

According to the present embodiment, while the getter material 188 is provided on the surface of the low-temperature reaction unit 6, the position where the getter material 188 is provided is not specifically limited inasmuch as the position within the inner side of the heat insulating package 200.

Operation of the microreactor module 1 will now be described herebelow.

To begin with, upon application of voltage between the lead wires 192 and 194, the getter material 188 is heated by the heater, and thus activated. As a consequence, the substances causing the pressure rise in the heat insulating package 200 are absorbed by the getter material 188, the vacuum degree in the heat insulating package 200 is increased, and hence the heat insulating efficiency is enhanced.

When voltage is applied between the lead wires 176 and 178, the heating wire 170 becomes exothermic to heat the low-temperature reaction unit 6. When voltage is applied between the lead wires 180 and 182, the heating wire 172 becomes exothermic, and thus the high-temperature reaction unit 4 is heated. When voltage is applied between the lead wires 184 and 186, the heating wire 174 becomes exothermic, and mainly the upper portion of the external flow pipe 10 of the supply and discharge unit 2 is heated thereby. Since the supply and discharge unit 2, the high-temperature reaction unit 4, the low-temperature reaction unit 6, and the coupling pipe 8 are made of the metal material, heat is easily transferred thereamong. The control device measures the potential and current associated with voltage drop of each heating wire 170, 172, 174 provided as a resistor whose resistance value is dependent on the temperature. Thereby, the temperatures of the supply and discharge unit 2, the high-temperature reaction unit 4, and the low-temperature reaction unit 6 are measured, and the measured temperatures are fed back to the control device. In order that the measured temperatures fall within a desired temperature range, the output voltages of the respective heating wires 170, 172 and 174 are controlled by the control device. In this manner, the temperature control of the supply and discharge unit 2, the high-temperature reaction unit 4, and the low-temperature reaction unit 6 is accomplished.

When the vaporization intake pathway 14 is continually or intermittently supplied with a liquid mixture of liquid fuel and water by pump or the like in the state that the supply and discharge unit 2, the high-temperature reaction unit 4, and the low-temperature reaction unit 6 are heated by the heating wires 170, 172 and 174, the liquid mixture is absorbed by the liquid absorptive material 33, and the liquid mixture is percolated upwardly of the vaporization intake pathway 14 by the capillary action. Since the liquid absorptive material 33 fills in to the portion where the combustor plates 12 exist, the liquid mixture inside the liquid absorptive material 33 is vaporized by the exothermic action or heat generation in the combustor plates 12, and the gas mixture of the fuel and water evaporates from the liquid absorptive material 33. Since the liquid absorptive material 33 is porous, the gas mixture is vaporized in respective chambers separated as a large number of small interior spaces. For this reason, bumping such as that occurring in a relatively large space can be restrained, therefore enabling stabilized vaporization.

The gas mixture, which has been vaporized from the liquid absorptive material 33, then flows into the first reformer 506 (reforming flow pathways 116, 118 and 128), through the through-hole 52, the gas mixture flow pathway 38, the first coupling flow pathway 162, and the supply flow pathway 114, and flows. Thereafter, the gas mixture flows into the second reformer 510 (reforming flow pathway 150) through the through-hole 54. When flowing along the reforming flow pathways 116, 118, 128 and 150, the gas mixture is heated to undergo catalyst reactions, thereby to generate hydrogen gas and the like (for the methanol fuel, see chemical reaction formulas (1) and (2) shown above).

Subsequently, the gas mixture (containing hydrogen gas, carbon dioxide gas, carbon monoxide gas and the like), which has been generated in the first reformer 506 and the second reformer 510, flows into the mixture flow pathway 40, through the well holes 156, 144, 130 and 124, the discharge flow pathway 115, and the second coupling flow pathway 164. Concurrently, air flows by the operation of, for example, a pump provided externally of the microreactor module 1, into the mixture flow pathway 40 from the air intake pathway 16 through the through-hole 60, wherein the gas mixture such as the hydrogen gas is mixed with the air.

Then, the gas mixture, which contains the air, the hydrogen gas, the carbon monoxide gas, the carbon dioxide gas and the like, travels through the well holes 66, 82 and 88 from the mixture flow pathway 40, and then flows into the carbon monoxide removing unit 512 (from the carbon monoxide removal flow pathway 84 to the carbon monoxide removal flow pathway 46). While the gas mixture is flowing from the carbon monoxide removal flow pathway 84 to the carbon monoxide removal flow pathway 46, the carbon monoxide gas in the gas mixture is selectively oxidized. Thus, the carbon monoxide gas is removed. In this case, the reaction of the carbon monoxide gas is not equally carried out along the path from the carbon monoxide removal flow pathway 84 to the carbon monoxide removal flow pathway 46. That is, the reaction speed of the carbon monoxide gas increases in a downstream region of the path from the carbon monoxide removal flow pathway 84 to the carbon monoxide removal flow pathway 46 (mainly in the portion from carbon monoxide removal flow pathway 80 to the carbon monoxide removal flow pathway 46). The oxidation reaction of the carbon monoxide gas is an exothermic reaction, so that heat is generated mainly in the portion from the carbon monoxide removal flow pathway 80 to the carbon monoxide removal flow pathway 46. Thus, below this portion there is located the external flow pipe 10, and therefore, heat generated by the oxidation reaction of the carbon monoxide gas is combined with the heat in the first combustor 504 and is used efficiently as heat for evaporation of the water and fuel in the vaporizer 502.

Then, the gas mixture, from which the carbon monoxide has bee removed, is supplied to, for example, the fuel electrode of the fuel cell through the through-hole 54 and the hydrogen discharge pathway 24. In the fuel cell, electricity is generated through the electrochemical reaction of the hydrogen gas supplied from the hydrogen discharge pathway 24. In this case, off gases containing unreacted hydrogen gas and the like are discharged from the fuel cell.

The operation described above is an initial stage operation, and the liquid mixture is continuously supplied to the vaporization intake pathway 14 during the power generation. Then, air is mixed into the off gases discharged from the fuel cell, and the gas mixture ("combustion gas mixture", hereafter) is supplied to the combustion gas mixture intake pathway 22 and the combustion gas mixture intake pathway 18. The combustion gas mixture, which has been supplied to the combustion gas mixture intake pathway 22, then flows into the combustion pathway 26 of the first combustor 504, in which the combustion gas mixture combusts. Thereby, the first combustor 504, which is provided such as to encircle the external flow pipe 10 on the lower side of the low-temperature reaction unit 6, heats the external flow pipe 10 and the low-temperature reaction unit 6 to a low temperature. Accordingly, power consumption of the heating wires 170 and 174 can be reduced, consequently enhancing energy utilization efficiency.

On the other hand, the combustion gas mixture supplied to the combustion gas mixture intake pathway 18 flows into the combustion chambers 138 and 140 of the second combustor 508, in which the combustion gas mixture combusts. Thus, combustion heat is generated, thereby to heat the first reformer 506 located below the second combustor 508 and the second reformer 510 located above the second combustor 508 to a high temperature. The second combustor 508 is vertically sandwiched by the first reformer 506 and the second reformer 510, so that the heat can be propagated efficiently along the plane direction. In addition, the portion exposed to the space closed by the heat insulating package 200 is small, so that heat losses can be minimized. Consequently, power consumption in the heating wire 172 can be reduced, and energy utilization efficiency can be enhanced. Further, combustible hydrogen with high density is not discharged out from the power generator unit containing, for example, the microreactor module 1 and the fuel cell, consequently making it possible to improve safety.

The configuration may be such that the liquid fuel stored in the fuel container is vaporized, and the combustion gas mixture of the vaporized fuel and air is supplied to the combustion gas mixture intake pathways 18 and 22.

In the state that the liquid mixture is supplied to the vaporization intake pathway 14, and the combustion gas mixture is supplied to the combustion gas mixture intake pathways 18 and 22, the control device measures the temperature in accordance with the resistances of the heating wires 170, 172 and 174, and concurrently controls the applied voltage to the heating wires 170, 172 and 174 and the pump and the like. When the pump is controlled by the control device, the flow rate of the combustion gas mixture to be supplied to the combustion gas mixture intake pathways 18 and 22 is controlled, whereby the amounts of the combustion heat in the combustors 504 and 508 are controlled. Thus, the control device controls the heating wires 170, 172 and 174 and the pump, thereby to perform the temperature control of the respective high-temperature reaction unit 4, low-temperature reaction unit 6, and supply and discharge unit 2. The temperature control is made in such a manner that the high-temperature reaction unit 4 is set to a range of 250° C. to 400° C. and preferably to a range of 300° C. to 380° C., and that the low-temperature reaction unit 6 is set to a temperature lower than the high-temperature reaction unit 4, more specifically to a range of 120° C. to 200° C. and preferably to a range of 140° C. to 180° C. More specifically, with reference to FIG. 13, the temperature control is performed to accomplish temperature distributions as follows. Preferably, a part shown by a line L1 and located near the bottom plate 53 of the low-temperature reaction unit 6 is controlled to 150° C. A part shown by a line L2 and located at the top of the liquid absorptive material 33 is controlled to 120° C. A part shown by a line L3 and located on the outer surface of the base plate 204 is controlled to 80° C. Further, a part shown by a line L4 and located below the liquid absorptive material 33 is controlled to 65° C.

That is, the external flow pipe 10 and the group of wires 197 exposed from the heat insulating package 200 are provided on the side of the low-temperature reaction unit 6, not on the side of the high-temperature reaction unit 4. This arrangement is made in order to maintain the interior of the heat insulating package 200 at a high temperature and to minimize the amount of heat dissipating to the outside of the heat insulating package 200. Further, the first combustor 504 is arranged only in the periphery of the upper portion of the liquid absorptive material 33, thereby to enable efficiently vaporization of the fuel in such a manner that the combustion heat in the first combustor 504 propagates to the external flow pipe 10 to progressively raise the temperature as the heat propagates from the lower portion to the upper portion along the liquid absorptive material 33 inside the vaporization intake pathway 14.

Further, before reaching the high-temperature reaction unit 4 and the low-temperature reaction unit 6, the fuel absorbed into the liquid absorptive material 33 in the vaporization intake pathway 14 and the air drawn from the air intake pathway 16, respectively, are preheated not only by the combustion heat in the first combustor 504, but also by heat of gases discharged from the exhaust gas discharge pathway 20 and the hydrogen discharge pathway 24.

Similarly, before reaching the second combustor 508 and the first combustor 504, the gas mixture drawn from the respective combustion gas mixtures intake pathway 18 and combustion gas mixture intake pathway 22 are preheated by heat of gases discharged from the exhaust gas discharge pathway 20 and the hydrogen discharge pathway 24.

Accordingly, fluids flowing along the vaporization intake pathway 14, the air intake pathway 16, the combustion gas mixture intake pathway 18, and the combustion gas mixture intake pathway 22 are heated by heat of fluids flowing along the exhaust gas discharge pathway 20 and the hydrogen discharge pathway 24. Concurrently, fluids flowing along the exhaust gas discharge pathway 20 and the hydrogen discharge pathway 24 are cooled by fluids flowing along the vaporization intake pathway 14, the air intake pathway 16, the combustion gas mixture intake pathway 18, and the combustion gas mixture intake pathway 22. Consequently, efficient heat exchange can be accomplished.

Accordingly, cooling means dedicated to cool the fluids in the exhaust gas discharge pathway 20 and the hydrogen discharge pathway 24 need not be separately used, or cooling means, if used, can be compacted.

Figure 18:
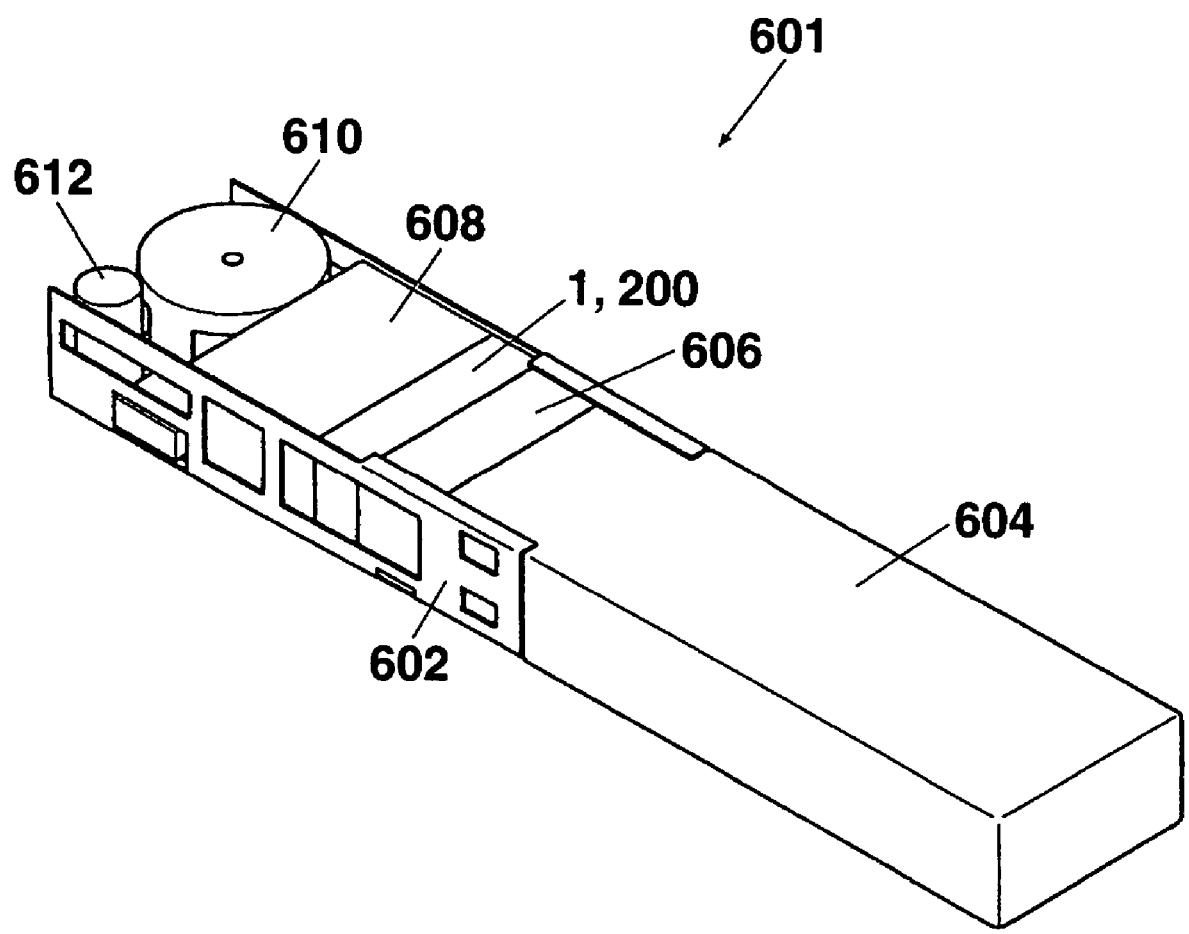
FIG. 18 is a perspective view of a power generator unit.

With reference to FIG. 18, the microreactor module 1 described above can be used by being assembled into a power generator unit 601. The power generator unit 601 includes, a frame 602; a fuel container 604 attachable to and detachable from the frame 602; a flow control unit 606 including a flow pathway, a pump, a flow sensor, a valve and the like; the microreactor module 1 stored in the heat insulating package 200; a power generation module 608 including the a fuel cell, a humidifier for humidifying the fuel cell and a collecting unit for collecting byproducts created in the fuel cell; an air pump 610 for supplying air (oxygen) to the microreactor module 1 and the power generation module 608; and a power supply unit 612 including a secondary cell, a DC-DC converter, an external interface through which the power generator unit 601 is electrically connected to an external device that is driven by the output of the power generator unit 601. When the gas mixture of water and liquid fuel in the fuel container 604 is supplied by the flow control unit 606 to the microreactor module 1, a hydrogen rich gas is generated, as described above. Then, the hydrogen rich gas is supplied to the fuel electrode of the power generation module 608 corresponding to the fuel cell, and electricity generated is charged in the secondary cell of the power supply unit 612.

Figure 19:
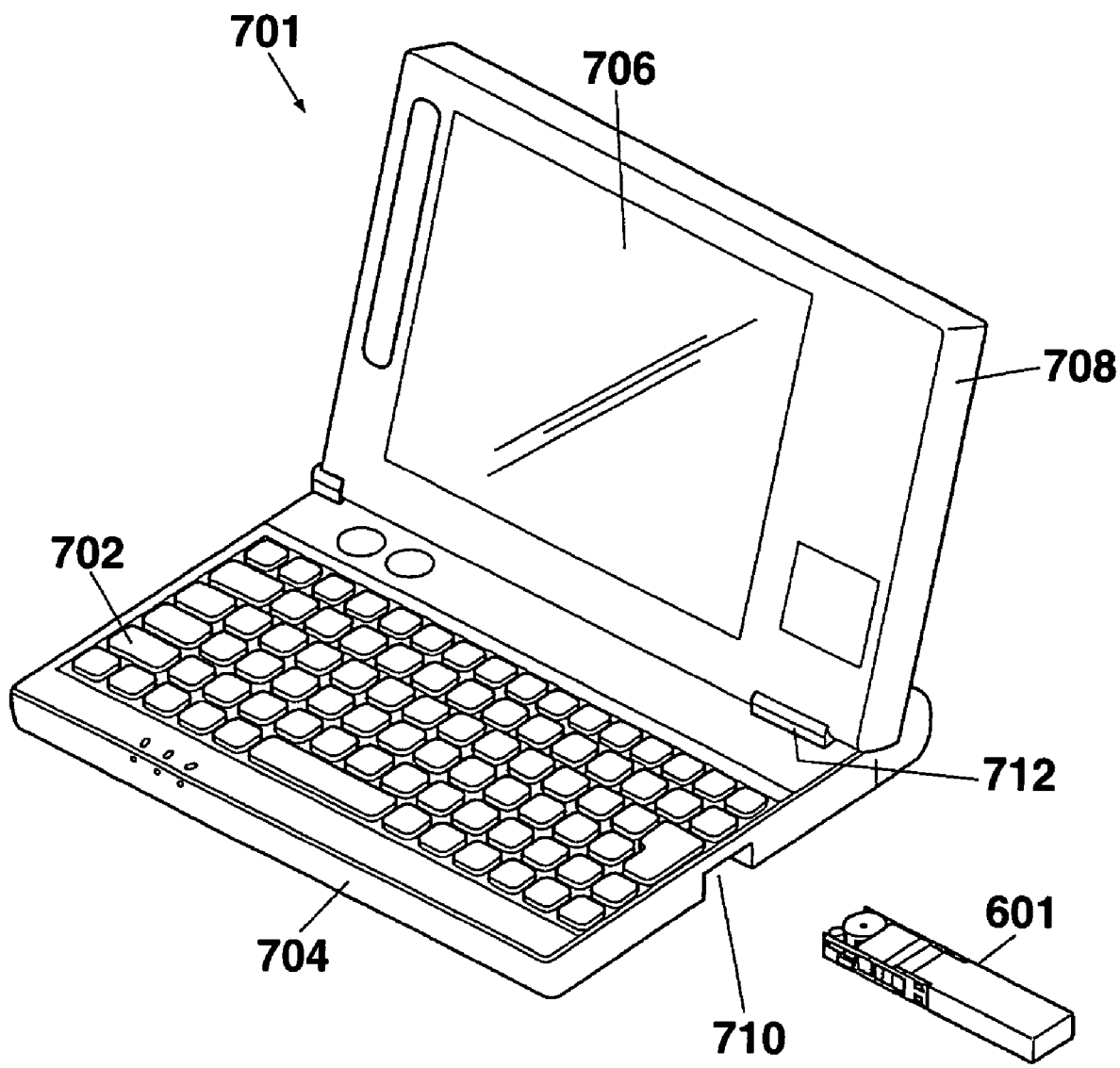
FIG. 19 is a perspective view of an electronic apparatus.

FIG. 19 is a perspective view of an electronic apparatus 701 using the power generator unit 601 as a power source. With reference to FIG. 19, the electronic apparatus 701 is a mobile or cellular electronic apparatus, and more specifically, a notebook personal computer. The electronic apparatus 701 includes a lower casing 704 and an upper casing 708. The lower casing 704 contains an arithmetic processing circuit configured to include a CPU, a RAM, a ROM, and other electronic components, and has a keyboard 702. The upper casing 708 has a display panel 706 such as a liquid crystal display panel. The lower and upper casings 704 and 708 are coupled together through hinge portions 712, and are foldable in the state where the upper casing 708 is overlapped with the lower housing 704 and the keyboard 702 opposes the display panel 706. A mounting portion or recess 710 for mounting the power generator unit 601 is provided in a portion extending from a right hand face of the lower housing 704 to a bottom face thereof. When the power generator unit 601 is mounted to the mounting portion 710, the electronic apparatus 701 becomes operable with the electricity supplied from the power generator unit 601.

As described hereinabove, according to the present embodiment, the interior space of the heat insulating package 200 is a heat insulating or heat-insulating space. In addition, the high-temperature reaction unit 4 is spaced apart from the low-temperature reaction unit 6. The distance from the high-temperature reaction unit 4 to the low-temperature reaction unit 6 is set to the length of the coupling pipe 8. Therefore, the heat transfer path from the high-temperature reaction unit 4 to the low-temperature reaction unit 6 is restricted only to the coupling pipe 8, whereby heat transfer to the low-temperature reaction unit 6 not needing high temperature is restrained. In particular, since the height and the width of the coupling pipe 8 are less than the height and the width of any one of the high-temperature and low-temperature reaction units 4 and 6, the heat transfer through the coupling pipe 8 is also minimized. Accordingly, heat losses in the high-temperature reaction unit 4 can be restrained, and the low-temperature reaction unit 6 can be prevented from the temperature elevating to be a specified temperature or higher. In other words, even in the case where the high-temperature reaction unit 4 and the low-temperature reaction unit 6 are accommodated in the single heat insulating package 200, temperature differences can be produced across or between both reaction units 4 and 6.

Further, since coupling flow pathways 162, 164, 166 and 168 are collectively arranged in the single coupling pipe 8, stresses can occur in the coupling pipe 8 and the like can be reduced. More specifically, since a temperature difference occurs between the high-temperature reaction unit 4 and the low-temperature reaction unit 6, the high-temperature reaction unit 4 expands greater than the low-temperature reaction unit 6. However, since the high-temperature reaction unit 4 is formed with free end sides excepting the coupling portion with the coupling pipe 8, stresses likely occurring in the coupling pipe 8 and the like can be restrained, and hence bending stresses in the coupling pipe 8 can be restrained. In particular, the coupling pipe 8 is smaller in the height and the width than any one of the high-temperature reaction unit 4 and the low-temperature reaction unit 6. In addition, the coupling pipe 8 is joined to the high-temperature reaction unit 4 and the low-temperature reaction unit 6 in the central portions of both reaction units 4 and 6 in the width direction. Consequently, stresses likely occurring in the coupling pipe 8, the high-temperature reaction unit 4, and the low-temperature reaction unit 6 can be restrained.

Since the single external flow pipe 10 is joined also between the low-temperature reaction unit 6 and the heat insulating package 200, stresses likely occurring in the external flow pipe 10 and the like can be reduced.

Suppose that flow pathways 162, 164, 166 and 168 are provided in coupling pipe members separately from one another, and the coupling pipe members are interposed between arranged high-temperature reaction unit 4 and the low-temperature reaction unit 6 in the state that the coupling pipe members are spaced from one another. In this case, stresses occur in the coupling pipe members, the low-temperature reaction unit 6, and the high-temperature reaction unit 4 because of a displacement difference across both reaction units 4 and 6. Alternatively, suppose that an external flow pipe member or members are arranged on the side of the high-temperature reaction unit 4. In this case, the temperature difference between the high temperature mode and the low temperature mode in the high-temperature reaction unit 4 is greater than the temperature difference between the high temperature mode and the low temperature mode in the low-temperature reaction unit 6. Thus, the amounts of the thermal expansion and the shrinkage are greater than the amounts of the thermal expansion and the shrinkage in the case where the pipe member is arranged on the side of the low-temperature reaction unit 6, so that hermeticity in the interior of the heat insulating package 200 is prone to impairment. According to the present embodiment, however, such occurrence of stresses and hermeticity can be secured.

The external flow pipe 10 and the lead wires 176, 178, 180, 182, 184, 186, 192 and 194 are extended externally of the heat insulating package 200, and are all joined to the low-temperature reaction unit 6. This arrangement makes it possible to inhibit direct heat dissipation from the high-temperature reaction unit 4 to the outside of the heat insulating package 200 and thus heat losses in the high-temperature reaction unit 4. Consequently, even in the case where the high-temperature reaction unit 4 and the low-temperature reaction unit 6 are accommodated in the single the heat insulating package 200, temperature differences can be produced between both reaction units 4 and 6. In particular, the vaporization intake pathway 14, the air intake pathway 16, the combustion gas mixture intake pathway 18, the exhaust gas discharge pathway 20, the combustion gas mixture intake pathway 22, and the hydrogen discharge pathway 24 are collectively provided in the single external flow pipe 10. Thereby, the area sizes of the exposed pipe surface can be minimized, and thus heat dissipation to the outside of the heat insulating package 200 from the surface of the pipe can be restrained, consequently making it possible to minimize heat losses.

The respective lower faces of the coupling pipe 8, the high-temperature reaction unit 4, and the low-temperature reaction unit 6 are flush with one another without irregularities or steps. Consequently, the heating wire 172 can be relatively easily patterned, and burnout of the heating wire 172 can be restrained.

In addition, the vaporization intake pathway 14 of the external flow pipe 10 is filled with the liquid absorptive material 33, thereby rendering the vaporization intake pathway 14 to serve as the vaporizer 502. Therefore, the microreactor module 1 is compacted and simplified, and concurrently, the temperature condition necessary for liquid mixture vaporization can be created (condition under which the upper portion of the vaporization intake pathway 14 reaches a temperature of 120° C.).

Further, the combustor plates 12 are provided in the periphery of the external flow pipe 10 in the upper end portion of the external flow pipe 10. Further, the liquid absorptive material 33 in the vaporization intake pathway 14 is provided to fill in to the height of the combustor plates 12, so that the combustion heat in the first combustor 504 can efficiently used for the vaporization of the liquid mixture.

Furthermore, the second combustor 508 is interposed between the first reformer 506 and the second reformer 510, so that the combustion heat in the second combustor 508 is equally transferred to both reformers 506 and 510. Consequently, no temperature difference is produced between the first and second reformers 506 and 510.

In any portions of the supply and discharge unit 2, the high-temperature reaction unit 4, the low-temperature reaction unit 6, and the coupling pipe 8, the partition walls partitioning the flow pathways are thinned. Consequently, heat capacities of these components can be reduced, and hence the supply and discharge unit 2, the high-temperature reaction unit 4, the low-temperature reaction unit 6, and the coupling pipe 8 can be quickly heated to high temperatures from the ambient temperature in the initial operational stage. Further, power consumption in the heating wires 170, 172 and 174 can be reduced.

First Modified Example

The present invention is not limited to the embodiment described, but may be improved and modified in design in various ways without departing the spirit and scope of the invention.

Figure 20A:
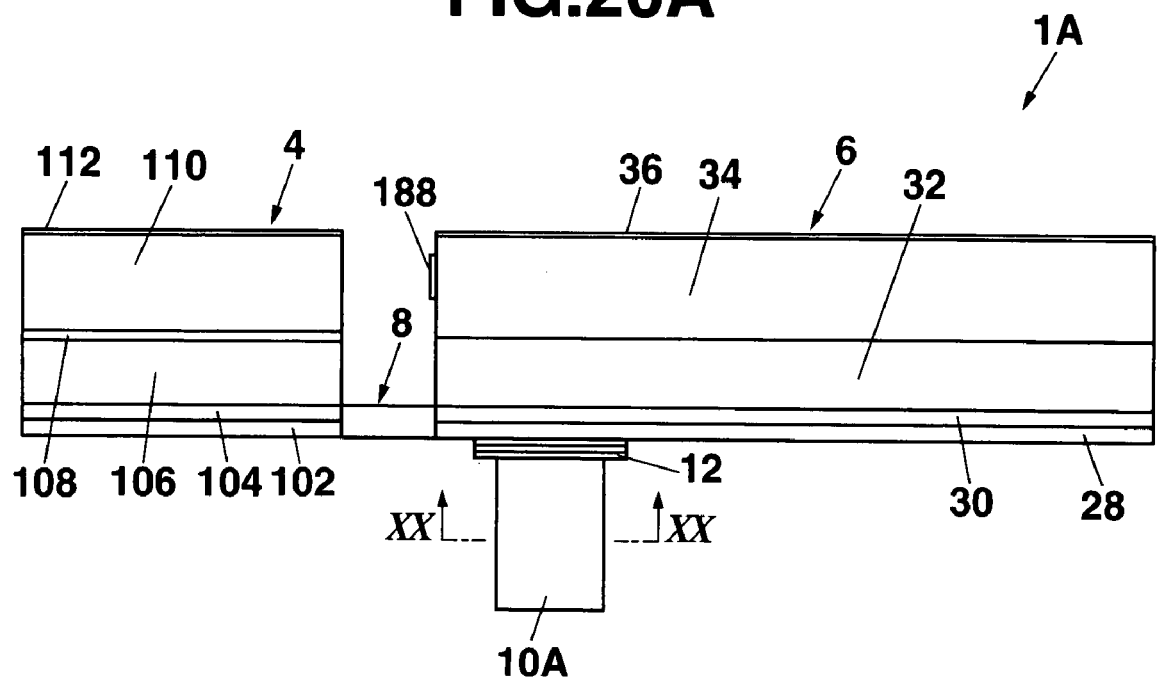
FIGS. 20A and 20B are views showing a first modified example of the microreactor module.
Figure 20B:
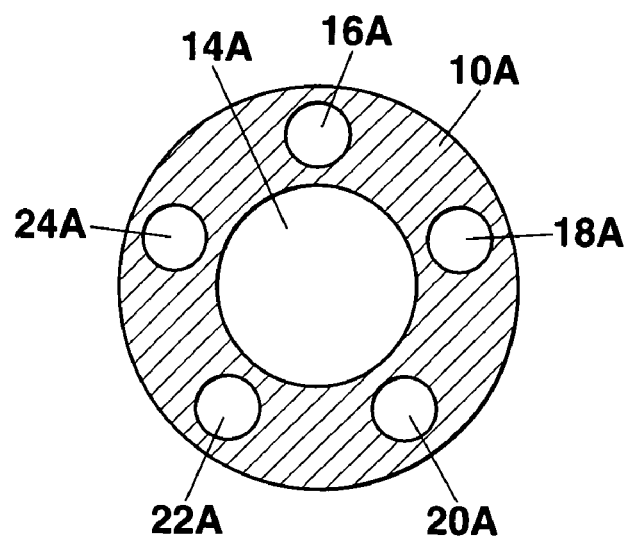

FIG. 20A is a side view of an apparatus, namely, a microreactor module 1A, in which the external flow pipe 10 is modified to a different external flow pipe 10A. FIG. 20B is a cross sectional view of the external flow pipe 10A taken along the section line XX-XX of FIG. 20A. The microreactor module 1A is provided in the same manner as the aforementioned microreactor module 1, except for the modification of the external flow pipe 10 to the external flow pipe 10A. Therefore, FIG. 20A shows portions corresponding to one another between the microreactor module 1A and the microreactor module 1 by using the same reference characters, and descriptions of the portions are omitted herefrom. As shown in FIG. 20B, the external flow pipe 10A is formed overall into a round hollow-column shape. A round-opening shaped vaporization intake pathway 14A is provided along a centerline of the external flow pipe 10A. A round-opening shaped air intake pathway 16A, a combustion gas mixture intake pathway 18A, an exhaust gas discharge pathway 20A, a combustion gas mixture intake pathway 22A, and a hydrogen discharge pathway 24A are provided parallel with each other around the vaporization intake pathway 14A. The flow pathways 14A, 16A, 18A, 20A, 22A and 24A, respectively, are partitioned an equally spaced by partition walls of the external flow pipe 10A. The external flow pipe 10A is joined to the lower face of the low-temperature reaction unit 6. The vaporization intake pathway 14A is in communication with the gas mixture flow pathway 38. The air intake pathway 16A is in communication with the mixture flow pathway 40. The combustion gas mixture intake pathway 18A in communication with the combustion gas mixture flow pathway 48. The exhaust gas discharge pathway 20A is in communication with the exhaust gas flow pathway 50 and the combustion pathways 26. The hydrogen discharge pathway 24A is in communication with the carbon monoxide removal flow pathway 46.

Second Modified Example

Figure 21A:
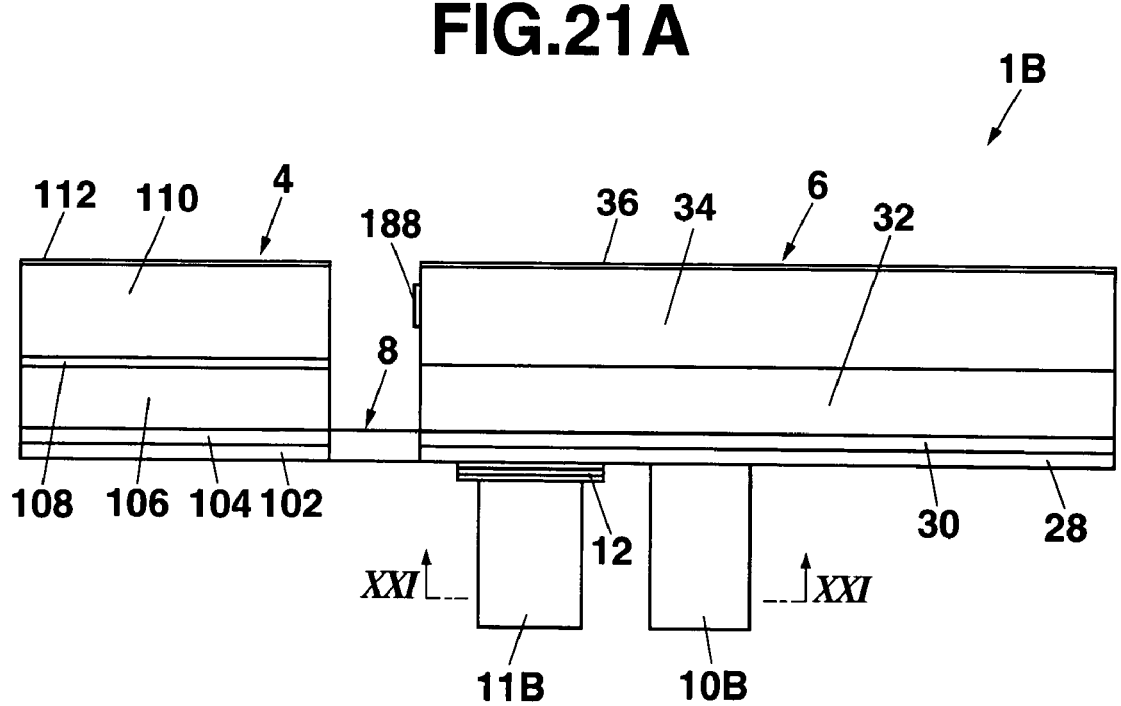
FIGS. 21A and 21B are views a second modified example of a microreactor module.
Figure 21B:
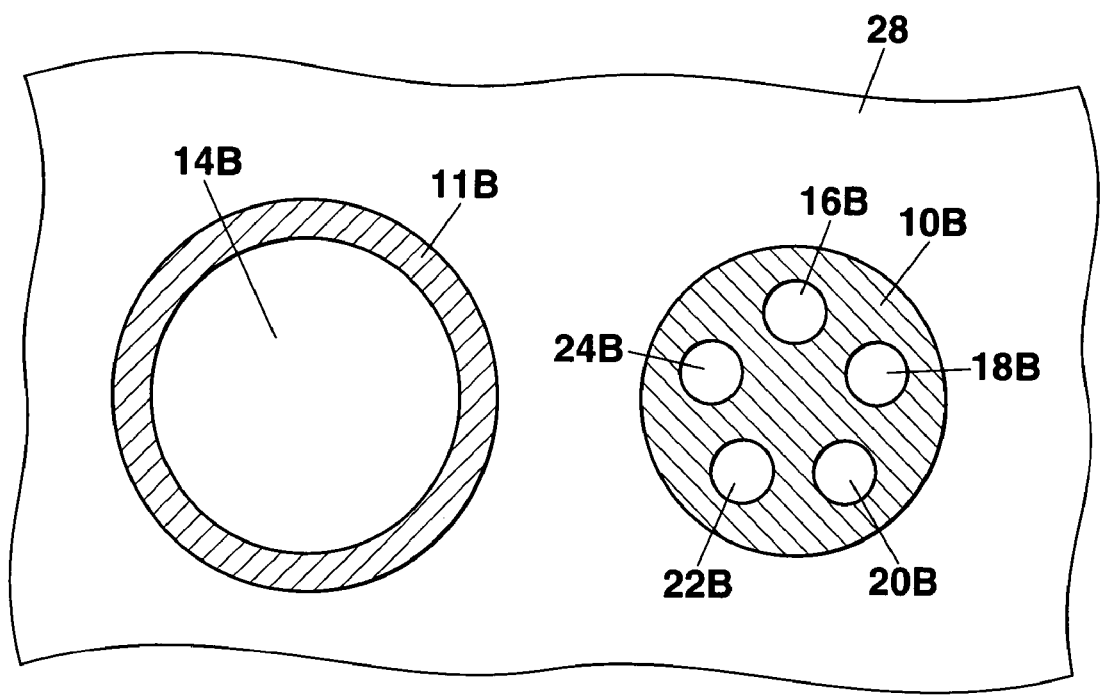

FIG. 21A is a side view of an apparatus, namely, a microreactor module 1B, in which the external flow pipe 10 is modified to a configuration having two, external flow pipe 10B and round pipe member 11B. FIG. 21B is a cross sectional view of the external flow pipe 10B taken along the section line XXI-XXI of FIG. 21A. The microreactor module 1B is provided in the same manner as the microreactor module 1, except for the modification of the external flow pipe 10 to the configuration having the external flow pipe 10B and the round pipe member 11B. Therefore, FIG. 21A shows portions corresponding to one another between the microreactor module 1B and the microreactor module 1 by using the same reference characters, and descriptions of the portions are omitted herefrom.

As shown in FIG. 21B, a round-opening shaped air intake pathway 14B is provided in the round pipe member 11B. In the external flow pipe 10B, there are provided a round-opening shaped air intake pathway 16B, a combustion gas mixture intake pathway 18B, an exhaust gas discharge pathway 20B, a combustion gas mixture intake pathway 22B, and a hydrogen discharge pathway 24B. The flow pathways 16B, 18B, 20B, 22B and 24B, respectively, are partitioned by partition walls of the external flow pipe 10B. The external flow pipe 10B and the round pipe member 11B are joined to the lower face of the low-temperature reaction unit 6. The vaporization intake pathway 14B is in communication with the gas mixture flow pathway 38. The air intake pathway 16B is in communication with the mixture flow pathway 40. The combustion gas mixture intake pathway 18B in communication with the combustion gas mixture flow pathway 48. The exhaust gas discharge pathway 20B is in communication with the exhaust gas flow pathway 50 and the combustion pathways 26. The hydrogen discharge pathway 24B is in communication with the carbon monoxide removal flow pathway 46.

Third Modified Example

Figure 22A:
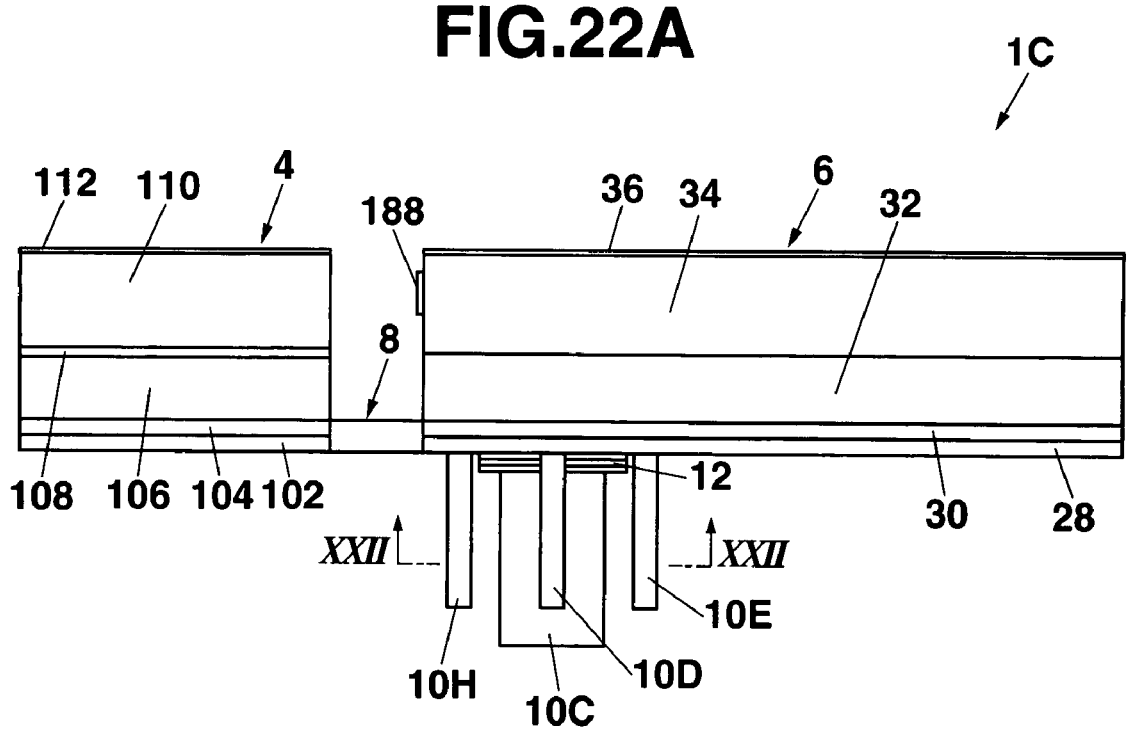
FIG. 22A is a view showing a third modified example of a microreactor module.
Figure 22B:
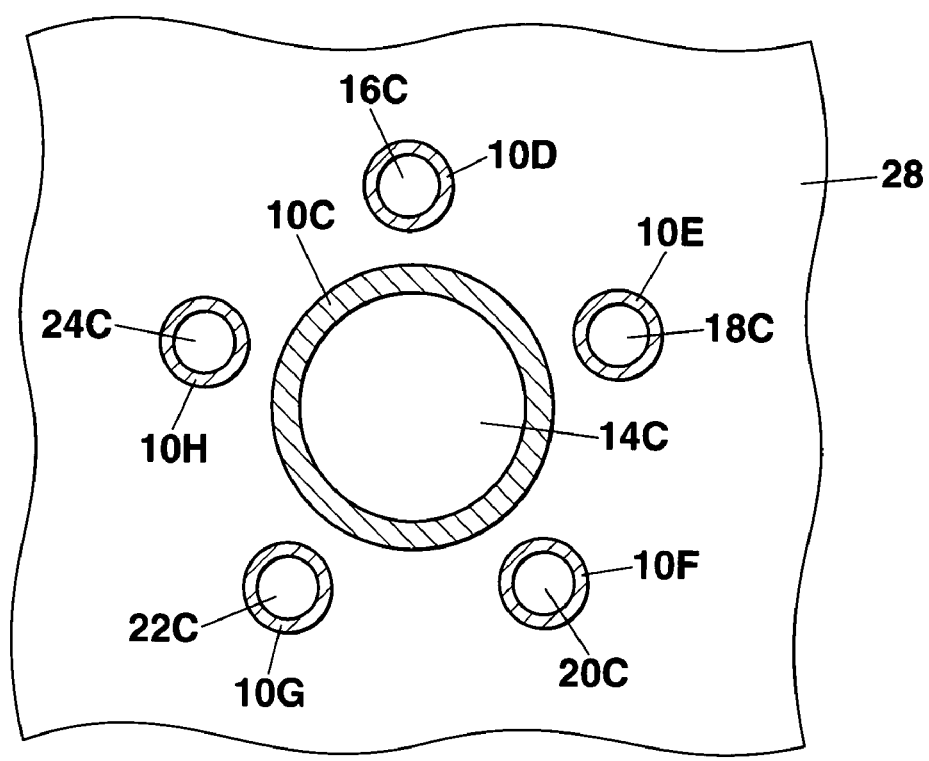
FIG. 22B is a cross sectional view taken along the section line XXII-XXII of FIG. 22A.

FIG. 22A is a side view of an apparatus, namely, a microreactor module 1C, in which the external flow pipe 10 is modified to a configuration having six round pipe members 10C to 10H. FIG. 22B is a cross sectional view taken along the section line XXII-XXII of FIG. 22A. The microreactor module 1C is provided in the same manner as the microreactor module 1, except for the modification of the external flow pipe 10 to the configuration having the round pipe members 10C to 10H. Therefore, FIG. 22A shows portions corresponding to one another between the microreactor module 1B and the microreactor module 1 by using the same reference characters, and descriptions of the portions are omitted herefrom.

As shown in FIG. 22B, in the round pipe members 10C to 10H, there are provided, respectively, a vaporization intake pathway 14C, an air intake pathway 16C, a combustion gas mixture intake pathway 18C, an exhaust gas discharge pathway 20C, a combustion gas mixture intake pathway 22C, and a hydrogen discharge pathway 24C. The round pipe members 10C to 10H are joined to the lower face of the low-temperature reaction unit 6. The vaporization intake pathway 14C is in communication with the gas mixture flow pathway 38. The air intake pathway 16C is in communication with the mixture flow pathway 40. The combustion gas mixture intake pathway 18C in communication with the combustion gas mixture flow pathway 48. The exhaust gas discharge pathway 20C is in communication with the exhaust gas flow pathway 50 and the combustion pathways 26. The hydrogen discharge pathway 24C is in communication with the carbon monoxide removal flow pathway 46.

Fourth Modified Example

The present invention is not limited to the embodiment and modifications described, but may be improved and modified in design in various ways without departing the spirit and scope of the invention.

Figure 23:
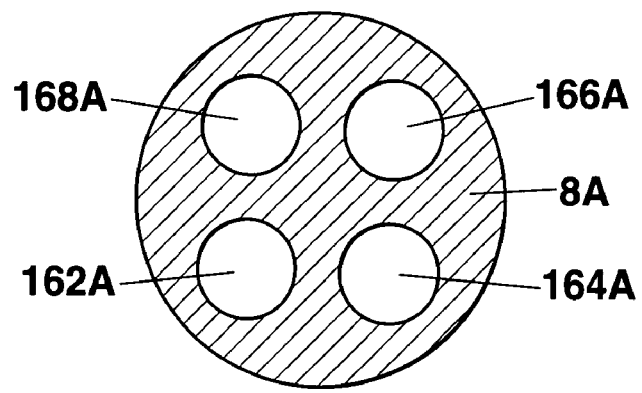
FIG. 23 is a cross sectional view of a first modified example of a coupling pipe.

FIG. 23 is a cross sectional view corresponds to FIG. 12, the view showing the case that the coupling pipe 8 is modified to a coupling pipe 8A. As shown in FIG. 23, the coupling pipe 8A is formed into a round column shape. In the coupling pipe 8A, cross-sectionally circular coupling flow pathways 162A, 164A, 166A and 168A are provided parallel to one another. The coupling flow pathways 162A, 164A, 166A and 168A correspond to the coupling flow pathways 162, 164, 166 and 168, respectively.

Fifth Modified Example

Figure 24:
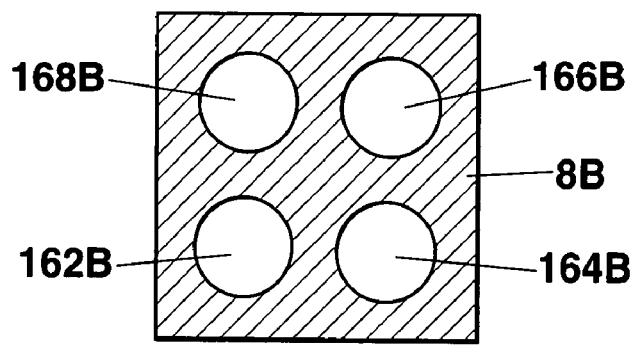
FIG. 24 is a cross sectional view of a second modified example of a coupling pipe.

FIG. 24 is a cross sectional view corresponds to FIG. 12, the view showing the case that the coupling pipe 8 is modified to a coupling pipe 8B. Also, while the coupling pipe 8B is formed into an angled column shape, coupling flow pathways 162B, 164B, 166B and 168B are each formed into a cross-sectionally circular shape. The coupling flow pathways 162B, 164B, 166B and 168B correspond to the coupling flow pathways 162, 164, 166 and 168, respectively.

Sixth Modified Example

Figure 25:
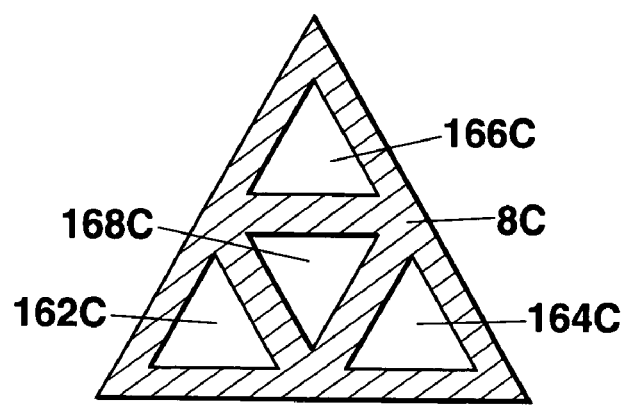
FIG. 25 is a cross sectional view of a third modified example of a coupling pipe.

FIG. 25 is a cross sectional view corresponds to FIG. 12, the view showing the case that the coupling pipe 8 is modified to a coupling pipe 8C. The coupling pipe 8C is formed into a triangular column shape, and coupling flow pathways 162C, 164C, 166C and 168C are each formed into a cross-sectionally triangular shape. The coupling flow pathways 162C, 164C, 166C and 168C correspond to the coupling flow pathways 162, 164, 166 and 168, respectively.

Seventh Modified Example

Figure 26:
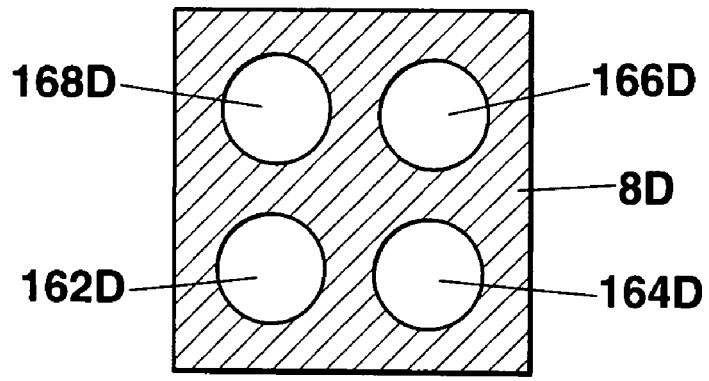
FIG. 26 is a cross sectional view of a fourth modified example of a coupling pipe.

FIG. 26 is a cross sectional view corresponds to FIG. 12, the view showing the case that the coupling pipe 8 is modified to a coupling pipe 8D. The coupling pipe 8D is formed into an angled column shape, and coupling flow pathways 162D, 164D, 166D and 168D are each formed into a cross-sectionally circular shape. The coupling flow pathways 162D, 164D, 166D and 168D correspond to the coupling flow pathways 162, 164, 166 and 168, respectively.

Eighth Modified Example

Figure 27:
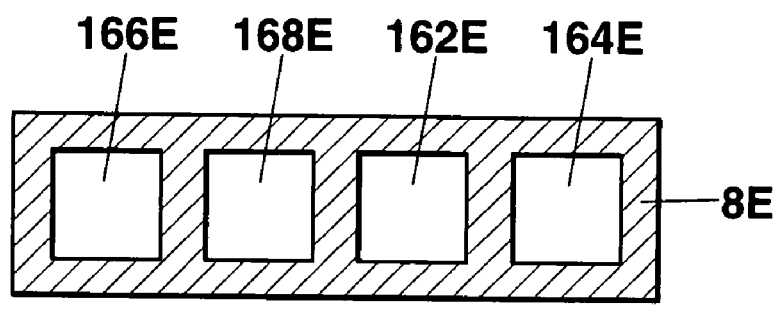
FIG. 27 is a cross sectional view of a fifth modified example of a coupling pipe.

FIG. 27 is a cross sectional view corresponds to FIG. 12, the view showing the case that the coupling pipe 8 is modified to a coupling pipe 8E. The coupling pipe 8E is formed into a rectangular column shape, and coupling flow pathways 162E, 164E, 166E and 168E are each formed into a cross-sectionally rectangle shape. In addition, the coupling flow pathways 162E, 164E, 166E and 168E are arranged in line along the width direction on a cross section along the width direction and the height direction of the coupling pipe 8E. The coupling flow pathways 162E, 164E, 166E and 168E correspond to the coupling flow pathways 162, 164, 166 and 168, respectively.

Ninth Modified Example

Figure 28:
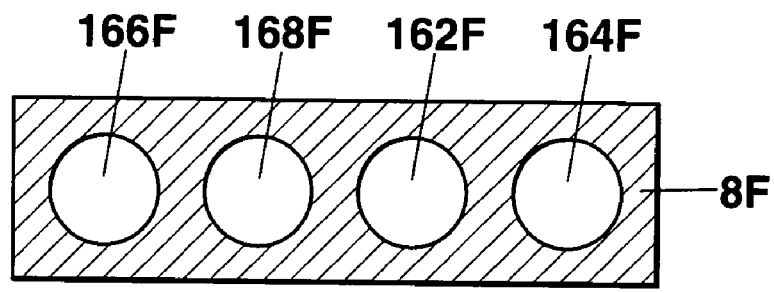
FIG. 28 is a cross sectional view of a sixth modified example of a coupling pipe.

FIG. 28 is a cross sectional view corresponds to FIG. 12, the view showing the case that the coupling pipe 8 is modified to a coupling pipe 8F. The coupling pipe 8F is formed into a rectangular column shape, and coupling flow pathways 162F, 164F, 166F and 168F are each formed into a cross-sectionally circular shape. In addition, the coupling flow pathways 162F, 164F, 166F and 168F are arranged in line along the width direction on a cross section along the width direction and the height direction of the coupling pipe 8F. The coupling flow pathways 162F, 164F, 166F and 168F correspond to the coupling flow pathways 162, 164, 166 and 168, respectively.

Figure 29:
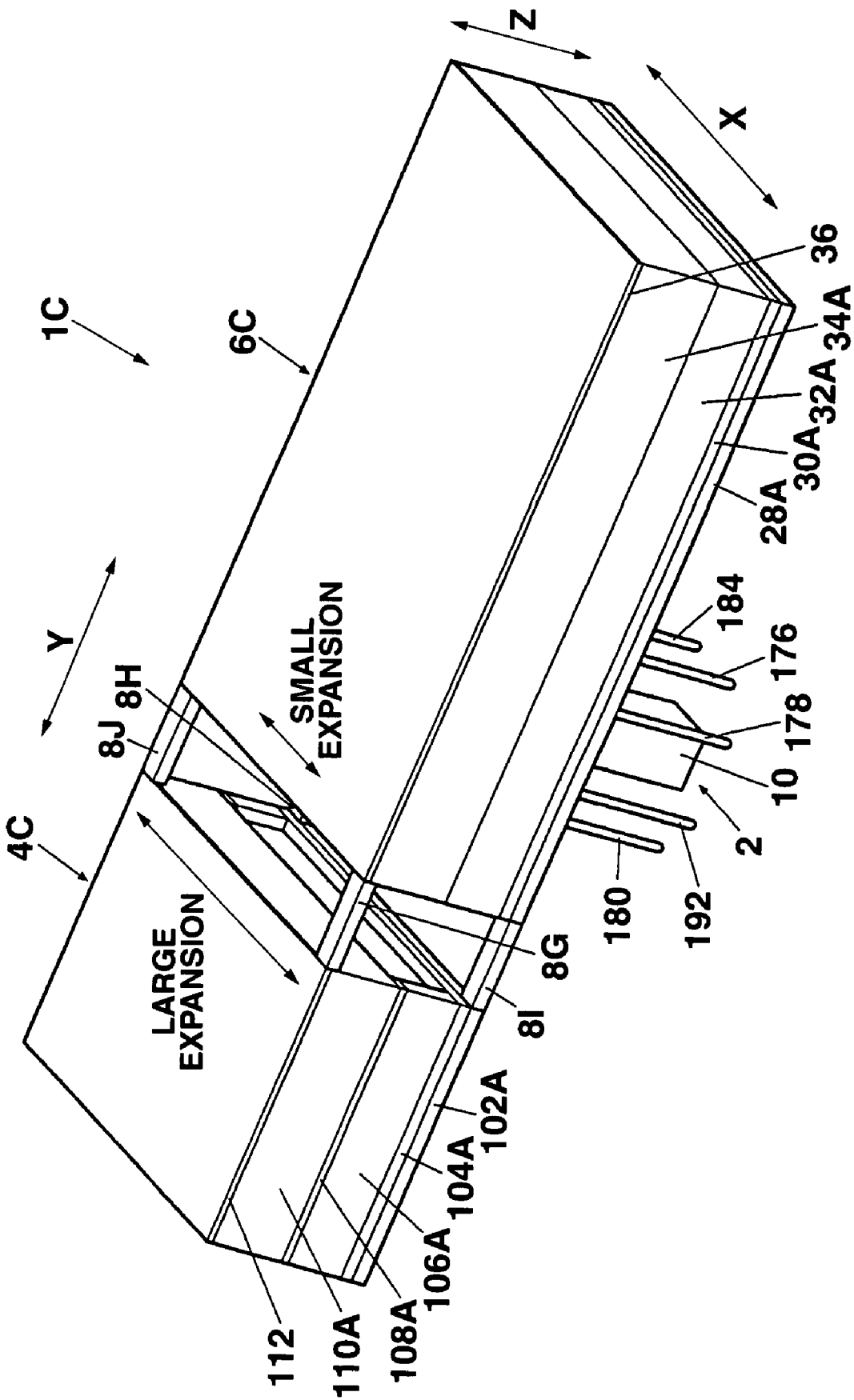
FIG. 29 is a view showing a comparative example of a microreactor module.

FIG. 29 is a perspective view showing a microreactor module 1C as a comparative example of the microreactor module 1, in which, instead of the coupling pipe 8 of the microreactor module 1, coupling pipes 8G, 8H, 8I and 8J formed by dividing the coupling pipe 8 are provided. A flow pathway configuration of a high-temperature reaction unit 4C is formed with a base plate 102A, a lower frame 104A, a central frame 106A, a combustor plate 108A, and an upper frame 34A to correspond to the layout of the coupling pipes 8G, 8H, 8I and 8J. The flow pathway configuration of the high-temperature reaction unit 4C is different from the flow pathway configuration of the high-temperature reaction unit 4 of the microreactor module 1, which is formed with the base plate 102, the lower frame 104, the central frame 106, the combustor plate 108, and the upper frame 110A. A flow pathway configuration of a low-temperature reaction unit 6C is formed with a base plate 28A, a lower frame 30A, a central frame 32A, and an upper frame 110A to correspond to the layout of the coupling pipes 8G, 8H, 8I and 8J. The flow pathway configuration of the low-temperature reaction unit 6C is different from the flow pathway configuration of the low-temperature reaction unit 6, which is formed with the base plate 28, the lower frame 30, the central frame 32, and the upper frame 34.

In the microreactor module 1C, the amount of the thermal expansion of the high-temperature reaction unit 4C is great while the amount of the thermal expansion of the low-temperature reaction unit 6C is relatively small. For this reason, in a width direction X and a height direction Z, the coupling pipes 8G and 8H receive stresses along the direction of expansion in portions joined to the high-temperature reaction unit 4C, and receive stresses along the direction of shrinkage in portions joined to the low-temperature reaction unit 6C to the extent of being prone to damage. Likewise, the coupling pipes 8I and 8J receive stresses along the direction of expansion in portions joined to the high-temperature reaction unit 4C, and receive stresses along the direction of shrinkage in portions joined to the low-temperature reaction unit 6C to the extent of being prone to damage.

However, according to any one the microreactor module 1 of the above-described embodiment and the microreactor modules of the respective modified examples, the coupling pipe 8 is joined at the single portion to the high-temperature reaction unit 4, so that substantially no distortion occurs in the portion along the X and Z directions. Likewise, the coupling pipe 8 is joined at the single portion to the low-temperature reaction unit 6, so that substantially no distortion occurs in the portion along the X and Z directions.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A reactor comprising:
   a high-temperature reaction unit which causes a first reaction of a first reaction material to create a second reaction material and a product;
   a low-temperature reaction unit which causes a second reaction of the second reaction material at a temperature lower than in the high-temperature reaction unit;
   a coupling pipe which is interposed between the high-temperature reaction unit and the low-temperature reaction unit, which has first and second opposite ends respectively connected to a part of one side wall of the high-temperature reaction unit and to a part of one side wall of the low-temperature reaction unit, and which transfers the first reaction material and the product created with the first reaction material between the high-temperature reaction unit and the low-temperature reaction unit;
   an external flow pipe having one end joined to the low-temperature reaction unit and including a first flow pathway for supplying the first reaction material to the high-temperature reaction unit through the low-temperature reaction unit and a second flow pathway for discharging the product from the high-temperature reaction unit through the low-temperature reaction unit; and
   a heat insulating package which accommodates the high-temperature reaction unit, the low-temperature reaction unit, and the coupling pipe, and also accommodates a part of the external flow pipe;
   wherein the external flow pipe extends outwardly through the heat insulating package; and
   wherein the external flow pipe supports the low-temperature reaction unit to the heat insulating package so that the high-temperature reaction unit, the low-temperature reaction unit, and the coupling pipe are situated apart from all inner surfaces of the heat insulating package.

2. A reactor according to claim 1, wherein the external flow pipe has one pipe member in which the first and second flow pathways are partitioned from each other by a partition wall.

3. A reactor according to claim 1, wherein the external flow pipe has first and second pipe members provided respectively with said first and second flow pathways.

4. A reactor according to claim 1, wherein the high-temperature reaction unit includes a reformer which reforms a fuel.

5. A reactor according to claim 1, wherein the low-temperature reaction unit includes a carbon monoxide removing unit which removes carbon monoxide contained in the product.

6. A reactor according to claim 1, wherein the high-temperature reaction unit includes a combustor which combusts a fuel.

7. A reactor according to claim 6, wherein the external flow pipe includes another flow pathway which supplies the fuel to the combustor.

8. A reactor according to claim 1, wherein the external flow pipe is provided with a vaporizer which causes a liquid fuel to vaporize.

9. A reactor according to claim 8, wherein the vaporizer is heated by heat in the second flow pathway for discharging the product from the high-temperature reaction unit.

10. A reactor according to claim 8, wherein the vaporizer is heated by a combustor which combusts a fuel supplied from another flow pathway of the external flow pipe.

11. A reactor according to claim 8, wherein the vaporizer is filled with a liquid absorptive material.

12. An electronic apparatus comprising:
    the reactor according to any one of claims 1 to 11; and
    a fuel cell which generates electricity by using the product created by the reactor.

13. An electronic apparatus according to claim 12, further comprising a display panel.

14. A reactor comprising:
    a high-temperature reaction unit which causes a first reaction of a first reaction material to create a second reaction material and a product;
    a low-temperature reaction unit which causes a second reaction of the second reaction material at a temperature lower than in the high-temperature reaction unit;
    at least one coupling pipe which is interposed between respective opposite faces of the high-temperature reaction unit and the low-temperature reaction unit and which has a width in a first direction that is less than widths of the respective opposite faces in the first direction;
    an external flow pipe having one end joined to the low-temperature reaction unit and including a first flow pathway for supplying the first reaction material to the high-temperature reaction unit through the low-temperature reaction unit and a second flow pathway for discharging the product from the high-temperature reaction unit through the low-temperature reaction unit; and
    a heat insulating package which accommodates the high-temperature reaction unit, the low-temperature reaction unit, and the coupling pipe, and also accommodates a part of the external flow pipe;
    wherein the external flow pipe extends outwardly through the heat insulating package; and
    wherein the external flow pipe supports the low-temperature reaction unit to the heat insulating package so that the high-temperature reaction unit, the low-temperature reaction unit, and the coupling pipe are situated apart from all inner surfaces of the heat insulating package.

15. A reactor according to claim 14, wherein a length of the coupling pipe in a second direction, which is perpendicular to the first direction, is smaller than a length of the high-temperature reaction unit in the second direction and a length of the low-temperature reaction unit in the second direction.

16. A reactor according to claim 14, wherein the coupling pipe is interposed in a central portion in the first direction of the respective opposite faces.

17. A reactor according to claim 14, wherein the number of the coupling pipes is only one.

18. A reactor according to claim 14, wherein the coupling pipe is provided with a plurality of coupling flow pathways which transfer either the first reaction material or the product between the high-temperature reaction unit and the low-temperature reaction unit.

19. A reactor according to claim 18, wherein said plurality of coupling flow pathways are arranged along the first direction of the coupling pipe.

20. A reactor according to claim 18, wherein said plurality of coupling flow pathways are arranged along the first direction and along a second direction, which is perpendicular to the first direction, of the coupling pipe in a cross section along the first and second directions.

21. A reactor according to claim 14, wherein thermal expansion coefficients of the high-temperature reaction unit and the low-temperature reaction unit are substantially the same.

22. An electronic apparatus comprising:
   the reactor according to claim 14; and
   a fuel cell which generates electricity by using the product created by the reactor.

23. An electronic apparatus according to claim 22, further comprising a display panel.

* * * * *